(12) United States Patent
Nishimori et al.

(10) Patent No.: US 7,327,636 B2
(45) Date of Patent: Feb. 5, 2008

(54) UNDERWATER SOUNDING APPARATUS AND METHOD CAPABLE OF CALCULATING FISH SCHOOL INFORMATION, VOLUME OF FISH SCHOOL AND BACKSCATTERING STRENGTH OF SINGLE FISH

(75) Inventors: Yasushi Nishimori, Nishinomiya (JP); Shinji Ishihara, Nishinomiya (JP); Emi Okazaki, Nishinomiya (JP)

(73) Assignee: Furuno Electric Company, Ltd., Hyogo-ken (JP)

( * ) Notice: Subject to any disclaimer, the term of this patent is extended or adjusted under 35 U.S.C. 154(b) by 301 days.

(21) Appl. No.: 11/093,301

(22) Filed: Mar. 30, 2005

(65) Prior Publication Data

US 2006/0072375 A1 Apr. 6, 2006

(30) Foreign Application Priority Data

Oct. 1, 2004 (JP) ............................. 2004-290795

(51) Int. Cl.
*G01S 15/96* (2006.01)
(52) U.S. Cl. ...................................... 367/131
(58) Field of Classification Search ................ 367/111, 367/131
See application file for complete search history.

(56) References Cited

U.S. PATENT DOCUMENTS 5,377,163 A * 12/1994 Simpson ..................... 367/131
7,193,930 B2 * 3/2007 Satoh et al. .................. 367/12
2002/0015358 A1 * 2/2002 Diachok ....................... 367/131
2005/0226099 A1 * 10/2005 Satoh et al. ................... 367/99
2006/0072375 A1 * 4/2006 Nishimori et al. ........... 367/111

FOREIGN PATENT DOCUMENTS

JP 1973-26299 8/1973
JP 2003-202370 7/2003

* cited by examiner

*Primary Examiner*—Daniel Pihulic
(74) *Attorney, Agent, or Firm*—Birch, Stewart, Kolasch & Birch, LLP

(57) ABSTRACT

An underwater sounding apparatus includes a transducer transmitting an acoustic sounding beam along a plurality of directional surfaces that intersect in three-dimensions and receiving echoes returning from within a fish school using receiving beams. The transducer can form the receiving beams in directions generally along a substantially vertical planar directional surface and in directions generally along a substantially umbrella-shaped directional surface formed around the ship, the umbrella-shaped directional surface intersecting both a horizontal plane and the vertical, planar directional surface. A signal processing section calculates fish quantity information about the fish school by constructing pseudo-three-dimensional data from data obtained by the receiving beam. Also, the signal processing section may binarize the data obtained by the receiving beams and calculates an approximate value of the volume of the fish school by constructing pseudo-three-dimensional data from the binarized data.

22 Claims, 9 Drawing Sheets

# UNDERWATER SOUNDING APPARATUS AND METHOD CAPABLE OF CALCULATING FISH SCHOOL INFORMATION, VOLUME OF FISH SCHOOL AND BACKSCATTERING STRENGTH OF SINGLE FISH

BACKGROUND OF THE INVENTION

1. Field of the Invention

The present invention relates generally to an underwater sounding apparatus for detecting a fish school by transmitting an ultrasonic signal and forming a receiving beam and, more particularly, to an underwater sounding apparatus capable of calculating fish school information such as the number of fish in the fish school, the volume of a fish school and the backscattering strength of a single fish.

2. Description of the Related Art

Acoustic sounding apparatuses, such as fish-finding echo sounders and scanning sonar, are conventionally used as means for detecting underwater fish schools (refer to Japanese Examined Patent Publication No. 1973-26299 and Japanese Unexamined Patent Publication No. 2003-202370, for example). Installed on a ship, a fish-finding echo sounder transmits a beam of ultrasonic sounding waves (acoustic waves) vertically beneath the ship's hull to search for and detect fish schools existing below the ship. A scanning sonar, also installed on a ship, transmits a beam of acoustic waves into underwater areas surrounding the ship to scan through the surrounding areas and detect fish schools present in these areas. A result of search carried out by such acoustic sounding apparatus is presented as a scanned image in the form of a specific cross section of a detected fish school. From a fisherman's point of view, however, merely displaying the scanned image of a detected fish school in the form of a specific cross section is not very helpful. It is preferable that the result of search be displayed in a manner that enables the fisherman to also recognize the number of individual fish constituting the fish school or the volume of the fish school. With such information it is possible to improve the fishing operation efficiency. This is particularly important for commercial fisherman who increasingly face pressures for increased efficiency.

To achieve this objective, a Japanese Unexamined Patent Publication No. 2003-202370, for example, proposes a scanning sonar which offers a choice of a horizontal scan mode, in which an acoustic sounding beam is horizontally steered at a specific tilt angle to scan through a full-circle area around a ship and a vertical scan mode, in which the acoustic sounding beam is vertically steered to scan an underwater situation in a generally vertical fan-shaped cross sectional area. This scanning sonar presents one or both of scanned images obtained in the horizontal scan mode and the vertical scan mode. This dual-mode presentation enables a fisherman to recognize the shape of a fish school in its entirety and estimate the number of individual fish constituting the fish school or the volume of the fish school, for instance. By comparison, a fish-finding echo sounder does not allow the fisherman to recognize the shape of a fish school in its entirety, because the fish-finding echo sounder transmits an acoustic sounding beam vertically downward from the ship.

Even with the aforementioned scanning sonar which presents the scanned images obtained in the horizontal scan mode and the vertical scan mode, however, it is generally not easy for a fisherman to manually recognize the shape of an entire fish school, for example, from a relationship between the horizontal and vertical mode images, but this skill of recognition greatly depends on the experience of individual fishermen. Furthermore, if fish school information is to be estimated based on the horizontal and vertical mode images, it is quite likely that different fishermen will differently judge the displayed images, producing considerable variations in estimated data. In other words, conventional systems merely provide qualitative, estimated values of the fish school information and other data and fail to provide quantitative measures.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS OF THE INVENTION

Figure 1:
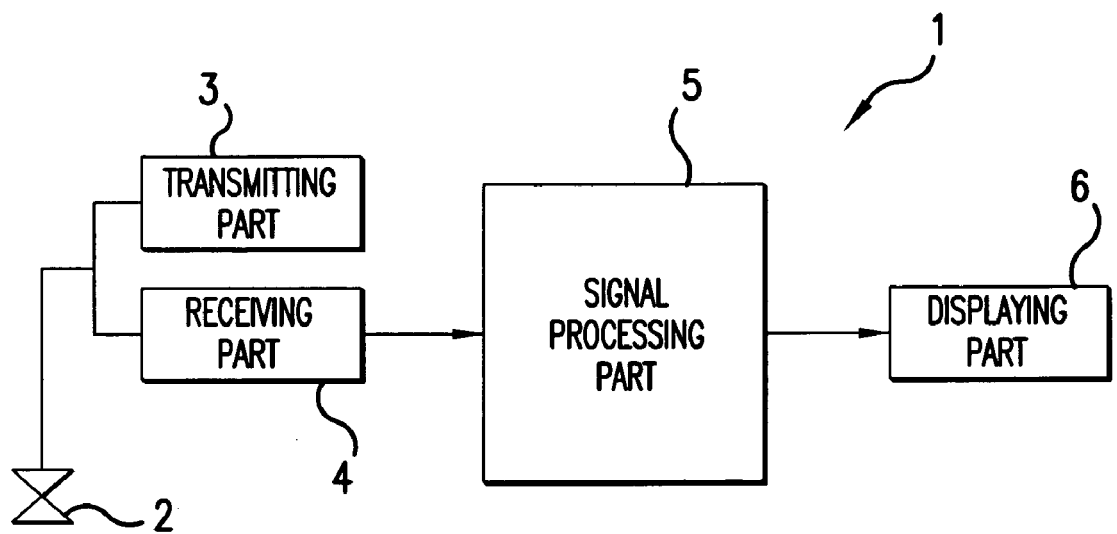
FIG. 1 is a block diagram generally showing the configuration of a scanning sonar system according to the present invention.

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The present invention includes an underwater sounding apparatus or system in which an algorithm is implemented to enable estimation of fish school information. The underwater sounding apparatus of this invention enables estimation of fish school information based on a principle of calculation using a spherical coordinate system. In particular, if the backscattering strength Ts of a typical fish (single fish) within a fish school FS is known, it is possible to estimate the number N of fish (fish quantity) in the fish school FS.

Here, the "backscattering strength Ts of a single fish" is an index or data value that may be obtained from an echo reflected by a single fish when an ultrasonic signal (acoustic signal) is emitted toward the single fish. It is known that the backscattering strength Ts of a single fish is approximately proportional to the square of the length of the single fish.

Also, in the explanation of this invention, the terms "fish quantity information about a fish school FS" and "fish quantity information" mean either an approximate value of the number N of individual fish in the fish school FS, or a target, or a value N×Ts obtained by multiplying the number N of individual fish in the fish school FS by the backscattering strength Ts of a typical single fish within the fish school FS. Since the "fish quantity information about a fish school FS" is a concept implying one or both of the number N of individual fish and the value N×Ts, an underwater sounding apparatus according to the present invention may be of a type which can calculate only the number N of individual fish in a fish school FS or the value N×Ts of that fish school FS, or both of these quantities.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The following discussion contains a description of a principle of calculating the fish quantity by use of a spherical coordinate system and a method of calculating information on the fish quantity in a fish school FS based on this calculating principle according to a first embodiment of the invention, a description of a method of calculating the volume of a fish school FS according to a second embodiment, and a description of a method of calculating the backscattering strength Ts of a single fish according to a third embodiment.

As an example of the underwater sounding apparatus of this invention, the following discussion deals with a multi-beam scanning sonar system 1 of which configuration is generally shown in a control block diagram of FIG. 1.

Referring to FIG. 1, the scanning sonar system 1 includes a transducer 2, a transmitter section 3, a receiver section 4, a signal processing section 5 and a display section 6. The transducer 2 is an electromechanical energy-converting device that may be installed on the hull bottom of a ship 7 as will be later discussed specifically.

The transmitter section 3 transmits a beam of an acoustic signal through the transducer 2. This beam emitted underwater is hereinafter referred to as the acoustic sounding beam. The receiver section 4 forms a receiving beam oriented in a specified direction and receives an echo reflected by a target, such as a fish school FS or a single fish.

The signal processing section 5 processes signals picked up by the receiving beam and calculates the fish quantity information about the fish school FS such as the approximate volume of the fish school FS and the backscattering strength (Ts) of a typical single fish within the fish school FS. The processing operations performed by the signal processing section 5 will be later discussed in detail with reference to the first to third embodiments. Signals processed by the signal processing section 5 include an equivalent input acoustic signal.

The present invention and particularly the signal processing section 5 generally relates to an apparatus for performing the operations described herein. This apparatus may be specially constructed for the required purposes such as a digital signal processor (DSP), application specific integrated circuit (ASIC), field programmable gate array (FPGA) special purpose electronic circuit, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of computer readable media suitable for storing electronic instructions.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description herein. In addition, the present invention is not described with reference to any particular programming language. It will be appreciated that a variety of programming languages may be used to implement the teachings of the invention as described herein.

The display section 6 may present, in addition to an ordinary and conventional sonar echo image, various combinations of information generated by the invention may be displayed such as an equivalent input sound intensity ($P_M{}^2$) obtained by the receiving beam, fish school information calculated by the signal processing section 5, the approximate volume of the fish school FS and a three-dimensional image thereof as well as the backscattering strength Ts of a typical single fish.

In the discussion of the individual embodiments to follow in this Specification, the position of the transducer 2 that may be installed on the hull bottom of the ship 7 is taken as origin O of a coordinate system, an imaginary axis extending forward from the origin O in a horizontal direction (or in a moving direction of the ship 7) is referred to as an x-axis (first axis), an imaginary axis extending perpendicular to the x-axis in a horizontal direction from the origin O is referred to as a y-axis (second axis), and an imaginary axis extending vertically downward from the origin O is referred to as a z-axis (third axis).

Further, an imaginary plane containing the x-axis and the y-axis is referred to as an xy-plane (horizontal plane), an imaginary plane containing the y-axis and the z-axis is referred to as a yz-plane, an imaginary plane containing the x-axis and the z-axis is referred to as an xz-plane. Also, a direction in which the acoustic sounding beam is aimed is referred to as an r direction. Here, the r direction makes an angle θ with the xy-plane and the orthogonal projection of the r direction on the xy-plane makes an angle φ with the x-axis.

It is noted that the coordinate system set forth above and used below does not limit the scope of the invention. While a spherical coordinate system has certain advantages particularly in terms understanding the concepts of the invention and simplifying certain calculations, a rectangular or other coordinate system may also be used and is within the inventive scope.

First Embodiment

According to the invention, it is possible to estimate information on the fish quantity in a given fish school FS based on the aforementioned principle of calculating fish quantity information using a spherical coordinate system. The principle of fish quantity information calculation using the spherical coordinate system is now described in detail in conjunction with calculation Examples 1 and 2 that are based on this principle with reference to the relevant drawings.

Figure 2:
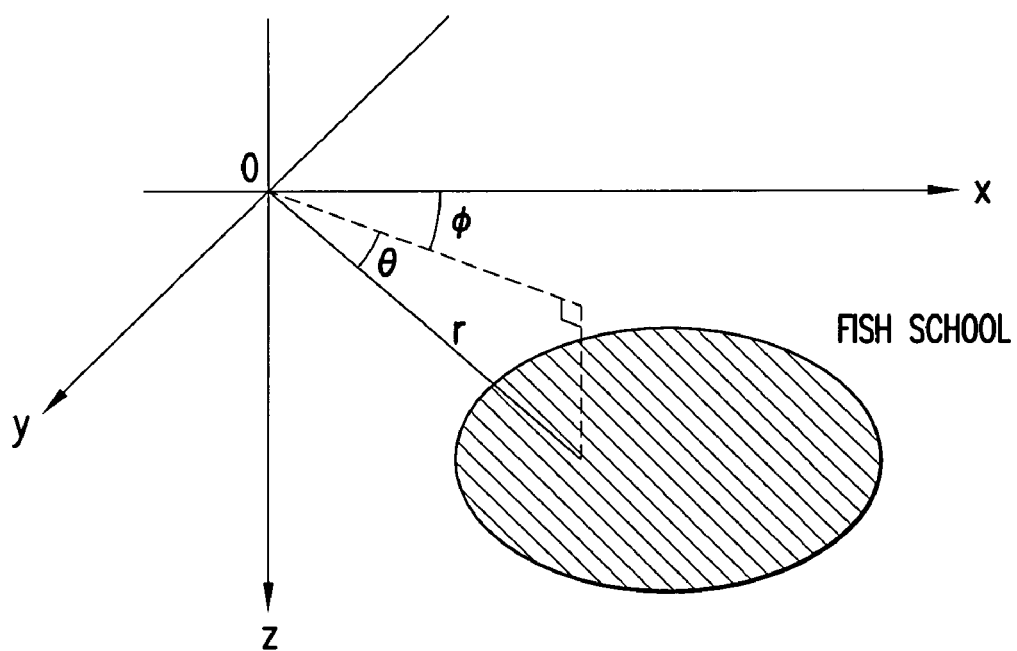
FIG. 2 is a diagram showing a model of a spherical coordinate system that may be used by the invention.

Principle of Fish Quantity Information Calculation Using Spherical Coordinate System First, the principle of fish quantity information calculation using a spherical coordinate system is discussed referring to FIG. 2, which is a diagram showing a model of the spherical coordinate system. In the following discussion, it is assumed that the transducer 2 has a spherical shape. This means that it is not necessary to take into consideration the dependency of transmit signal intensity $P_O{}^2$ and equivalent beam width ψ on the angle θ the r direction makes with the xy-plane. If these considerations are taken into account, then it is also possible to use a different shape for the transducer 2 as further explained below.

Referring to FIG. 2, part of the acoustic sounding beam emitted underwater from the transducer 2 (origin O) is reflected by the fish school FS and the transducer 2 receives an echo returning from the fish school FS by the receiving beam. In this process, the transducer 2 emits the sounding beam in directions represented by the angle θ (measured in a vertical plane) the sounding beam makes with the xy-plane and the angle φ (measured horizontally clockwise) the sounding beam makes with the xz-plane, where the angle θ and the angle φ typically have ranges expressed by $0 \leq \theta \leq \pi/2$ (rad) and $0 \leq \phi \leq 2\pi$ (rad), respectively, in the multi-beam scanning sonar system 1. If the density of fish (number of fish per unit volume) at a given point (r, θ, φ) in the fish school FS is n(r, θ, φ), the total number N of fish in the fish school FS is given by equation (1) below:

$$N = \int n(r, \theta, \phi) \cdot r^2 \cos\theta \cdot dr d\theta d\phi \tag{1}$$

Figure 2A:
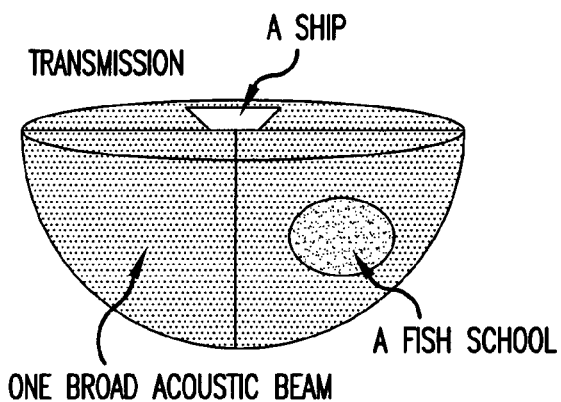
FIGS. 2A, 2B, 2C and 2D show exemplary acoustic sounding beam patterns and reception beam patterns that may be used by the invention.

FIG. 2a shows an illustrative beam pattern which may be formed when the transducer 2 emits the sounding beam according to the above description. As shown therein, a broad acoustic beam may be transmitted from a transducer (not shown) on the ship.

It is noted that the angle ranges are illustrative only. In other words, it is within the scope of the invention to use a sounding beam that is oriented in a different direction or which has a more limited or expanded field of view as compared with the particular examples explained herein. One non-limiting example of such a transmit beam pattern may be found in FIG. 2c that shows a sounding beam that has a narrower range for the θ angle.

Part of the acoustic sounding beam emitted underwater from the transducer 2 is reflected by the fish school FS located at the point (r, θ, φ) and the transducer 2 receives the echo returning from the direction of the point (r, θ, φ) by the receiving beam as mentioned above.

Figure 2B:
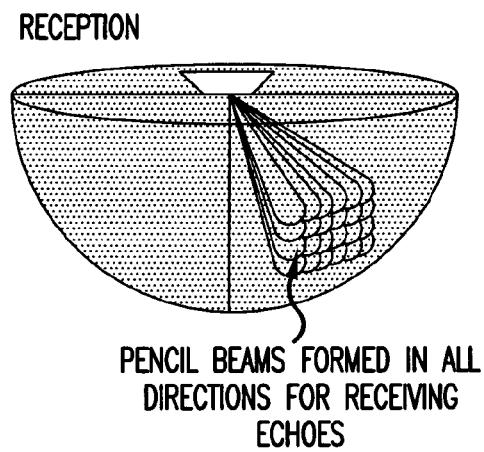
Figure 2C:
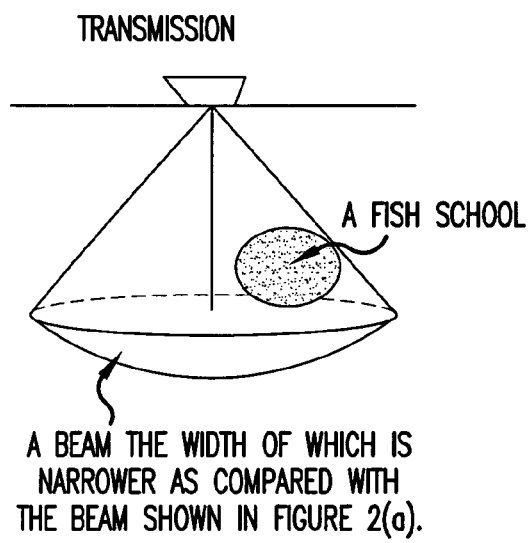
Figure 2D:
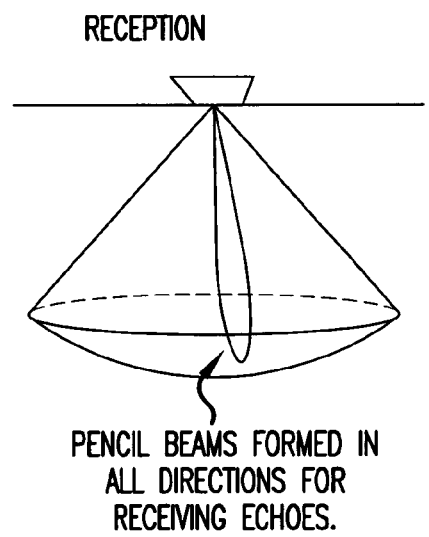

FIG. 2b illustrates the pencil-like reception beams that may be formed by the transducer 2 in the same three-dimensional space as the sounding beam. Another alternative is shown in FIG. 2d in which pencil-like reception beams are formed in a three-dimensional space having more limited angular extent than the three-dimensional space sounded in FIGS. 2a and 2b.

The signal processing section 5 processes an incoming echo signal to work out the equivalent input sound intensity $P_M{}^2$ of the input echo signal for that direction. A sequence of operations performed by the signal processing section 5 is explained below in detail.

Given the angle θ and the angle φ the receiving beam makes with the xy-plane and the xz-plane, respectively, and the range r from the origin O to the point (r, θ, φ) converted from elapsed time from transmission, the equivalent input sound intensity $P_M{}^2$ is expressed by equation (2) below:

$$P_M^2(r, \theta, \phi) = Ts \cdot \frac{P_0^2}{r^4}(e^{-2\alpha r})^2, \tag{2}$$

$$\int n(r', \theta', \phi') \cdot h(r', \theta', \phi'; r, \theta, \phi) \cdot r'^2 \cos\theta' \cdot d\,r' d\theta' d\phi'$$

where $P_O{}^2$ is the transmit signal intensity, α is an absorption loss coefficient, and h is a point spread function.

Figure 3A:
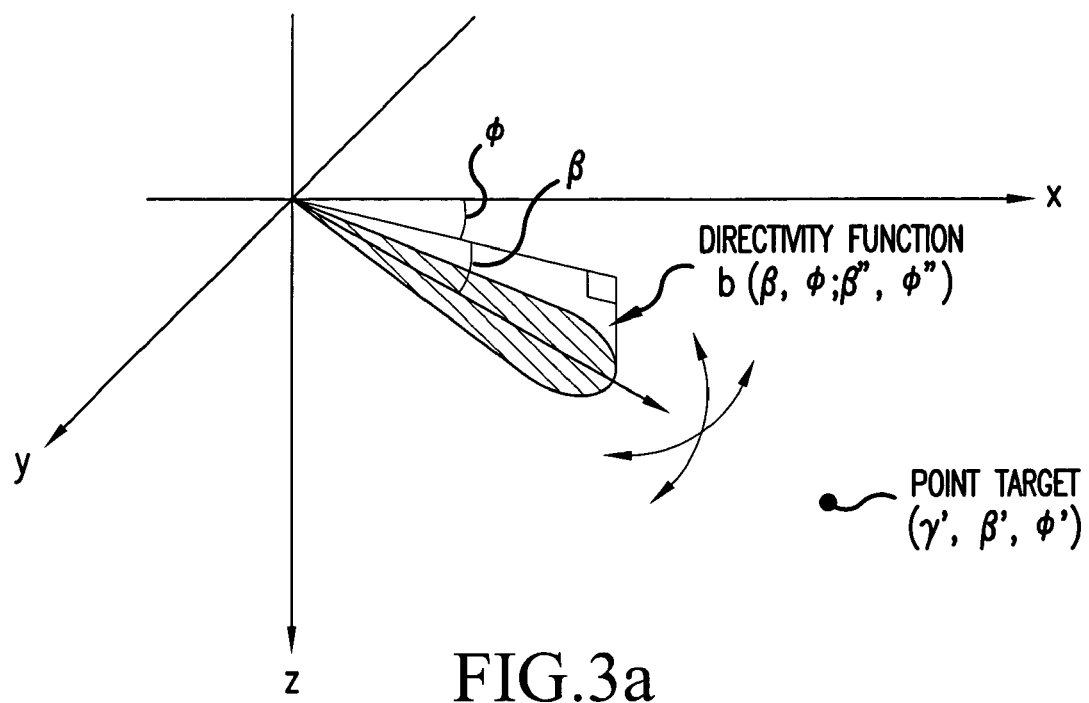
FIG. 3A is a diagram showing how an acoustic sounding beam is steered in θ and φ directions by the invention to perform two-dimensional continuous scanning in a spherical coordinate system.
Figure 3B:
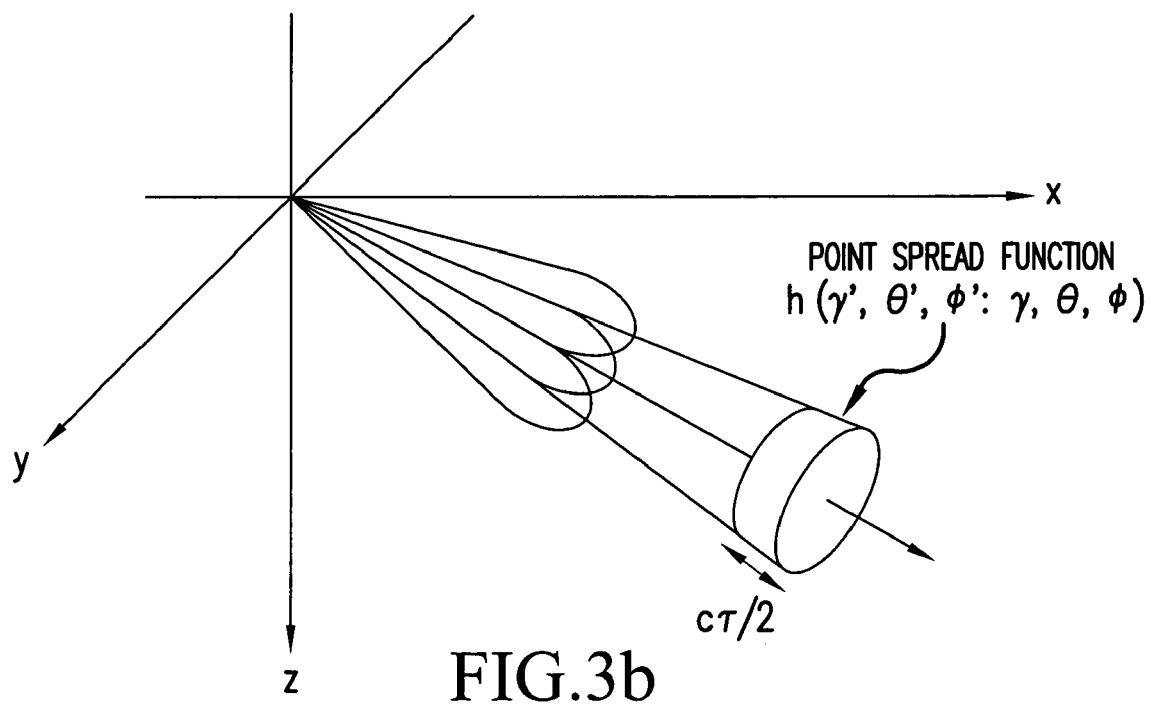
FIG. 3B is a diagram showing an imaging result produced by the invention using two-dimensional continuous scanning of a point target.

The aforementioned point spread function h is explained in detail below referring to FIGS. 3A and 3B, in which FIG. 3A shows how an acoustic beam is steered in θ and φ directions to perform two-dimensional continuous scanning in a spherical coordinate system and FIG. 3B shows a result of imaging obtained by two-dimensional continuous scanning of a point target. Here, a transmit-receive product directivity function of a single acoustic beam is expressed by $b(\theta, \phi; \theta'', \phi'')$, which represents beam sensitivity normalized in a $(\theta'', \phi'')$ direction of the acoustic beam transmitted in and received from the $(\theta, \phi)$ direction. To add, performing two-dimensional continuous scanning with a single acoustic beam is equivalent to sounding a three-dimensional space by using a number of acoustic beams of which transmitting and receiving directions $(\theta, \phi)$ differ one another. For this reason, the term "multi-beam" scanning sonar is used herein and encompasses both equivalent alternatives.

Referring to FIG. 3A, the scanning sonar system 1 sounds the point target having a reflection factor of 1 located at a point $(r', \theta', \phi')$ by using an acoustic beam having a pulselength $\tau$ and plots normalized received sound intensity time series data $P^2(r, \theta, \phi)$ obtained by the acoustic beam oriented in the $(\theta, \phi)$ direction at a point $(r, \theta, \phi)$. Consequently, the acoustic beam has a spreading range (reverberation volume) corresponding to its beam width and pulselength as depicted in FIG. 3B. This spreading range is referred to as the point spread function which is expressed by $h(r', \theta', \phi'; r, \theta, \phi)$. Here, the normalized received sound intensity is a quantity obtained by converting a received sound intensity signal into target strength by correcting the received sound intensity signal with time-varied gain (TVG) and transmitting sound pressure, or by multiplying the received sound intensity signal by $r^4 P_O^2 (e^{2\alpha r})^2$. The normalized received sound intensity may be considered as a three-dimensional response from a point target normalized to a maximum value of 1.

The point spread function $h(r', \theta', \phi'; r, \theta, \phi)$ can be expressed by equation (3) below by using the transmit-receive product directivity function $b(\theta, \phi; \theta'', \phi'')$ and a transmit signal envelope function $R(r)$:

$$h(r', \theta', \phi'; r, \theta, \phi) = R(r-r') \cdot b(\theta, \phi; \theta', \phi') \quad (3)$$

where the transmit signal envelope function $R(r)$ is given by equation (4) below:

$$R(r) = 1 \quad |r| \leq c\tau/4 \quad (4)$$
$$= 0 \quad |r| > c\tau/4$$

where c is the sound velocity

Equations (3) and (4) above indicate that the point target existing at the point $(r', \theta', \phi')$ spreads as much as the pulselength in the range r direction and as much as $b(\theta, \phi; \theta', \phi')$ in the directions of r and imaginary vertical planes.

A volume integral of the point spread function is $c\tau/2 \times r^2 \times \psi$, where $\psi$ is referred to as the equivalent beam width which is defined by a quadratic function of $b(\theta, \phi; \theta', \theta')$. The value of a volume integral of a point spread function obtained when using a cylindrical coordinate system may be assumed to be equal to $c\tau/2 \times r^2 \times \psi$.

The multi-beam scanning sonar system 1 successively acquires and integrates equivalent input sound intensities $P_M^2$ derived from individual volume elements along the r, $\theta$ and $\phi$ directions. Multiplying the aforementioned equation (2) by $r^4 P_O^2 (e^{2\alpha r})^2$ and volume element $r^2 \cos\theta dr d\theta d\phi$ and integrating the result along the r, $\theta$ and $\phi$ directions, we obtain equation (5) below:

$$\int P_M^2(r, \theta, \phi) \cdot r^4 (e^{2\alpha r})^2 \cos\theta \cdot dr d\theta d\phi = Ts \cdot P_0^2 \cdot \int n(r', \theta', \phi') \cdot \quad (5)$$
$$\left\{ \int h(r', \theta', \phi'; r, \theta, \phi) \cdot \cos\theta dr d\theta d\phi \right\} \cdot r'^2 \cos\theta' \cdot dr' d\theta' d\phi'$$

Here, the integral function enclosed in braces { } in equation (5) can be expanded as shown in equation (6) below:

$$\int h(r', \theta', \phi'; r, \theta, \phi) \cdot \cos\theta \cdot dr d\theta d\phi = \int \frac{h(r', \theta', \phi'; r, \theta, \phi)}{r^2} \cdot r^2 \cos\theta \cdot \quad (6)$$
$$dr d\theta d\phi$$
$$= \frac{1}{r'^2} \cdot \int h(r', \theta', \phi'; r, \theta, \phi) \cdot$$
$$r^2 \cdot \cos\theta \cdot dr d\theta d\phi$$
$$= \frac{1}{r'^2} \cdot r'^2 \cdot \frac{c\tau}{2} \psi$$
$$= \frac{c\tau}{2} \psi$$

Taking into consideration the finiteness of h (a spreading range of $c\tau/2$ in the r direction), r is regarded as having a fixed value r' within an effective integration range of h and, thus, r' is placed outside of the integral expression in the third line of equation (6) above, in which c is the sound velocity, $\tau$ is the pulselength and $\psi$ is the equivalent beam width. Substituting equations (1) and (6) into equation (5) above, we obtain equation (7) below:

$$\int P_M^2(r, \theta, \phi) \cdot r^4 (e^{2\alpha r})^2 \cos\theta \cdot dr d\theta d\phi = Ts \cdot P_0^2 \cdot \frac{c\tau}{2} \psi \cdot \int n(r', \theta', \phi') \cdot \quad (7)$$
$$r'^2 \cos\theta' \cdot dr' d\theta' d\phi'$$
$$= Ts \cdot P_0^2 \cdot \frac{c\tau}{2} \psi \cdot N$$

Rewriting equation (7), we obtain equation (8) below:

$$N \cdot Ts = \frac{2}{c\tau} \cdot \frac{1}{P_0^2 \psi} \int P_M^2(r, \theta, \phi) \cdot r^4 (e^{2\alpha r})^2 \cdot \cos\theta \cdot dr d\theta d\phi \quad (8)$$

The product N×Ts of the backscattering strength Ts of a typical single fish constituting the fish school FS and the number N of fish in the fish school FS can be calculated from equation (8) above based on the principle of fish quantity information calculation using the spherical coordinate system. Also, if the backscattering strength Ts of the typical single fish constituting the fish school FS is known, the number N of fish in the fish school FS can be calculated from equation (8). In this way, it is possible to obtain an approximate value of the number N of fish in the fish school FS.

While the principle of fish quantity information calculation has been discussed, by way of example, on the assumption that the transducer 2 has a spherical shape in the foregoing, the principle of calculation is not limited to this example but is applicable even when the transducer 2 has a cylindrical shape. In the latter case, it is necessary to take into consideration the dependency of the transmit signal intensity $P_O^2$ and the equivalent beam width $\psi$ on the angle $\theta$ the r direction makes with the xy-plane. In this case (where the transducer 2 has a cylindrical shape), expressing the transmit signal intensity as $P_O^2(\theta)$ and the equivalent beam width as $\psi(\theta)$, the multi-beam scanning sonar system 1 successively acquires and integrates equivalent input sound intensities $P_M^2$ derived from individual volume elements along the r, $\theta$ and $\phi$ directions. The result of this operation is equation (9) below:

$$P_M^2(r, \theta, \phi) = Ts \cdot \frac{P_0^2(\theta)}{r^2}(e^{-2\alpha r})^2 \cdot \int n(r', \theta', \phi') \cdot h(r', \theta', \phi' : r, \theta, \phi) \cdot r'^2 \cos\theta' \cdot dr' d\theta' d\phi' \quad (9)$$

Here, multiplying equation (9) above by $r^4 P_O^2(e^2\alpha^r)^2 \cdot \cos\theta/(P_O^2(\theta)\psi(\theta))$ and integrating the result along the r, $\theta$ and $\phi$ directions, we obtain equation (10) below:

$$\int P_M^2(r, \theta, \phi) \cdot r^4 (e^{2\alpha r})^2 \cdot \frac{1}{P_0^2(\theta)\psi(\theta)} \cos\theta \cdot dr d\theta d\phi = Ts \cdot \int n(r', \theta', \phi') \cdot \left\{ \int \frac{h(r', \theta', \phi'; r, \theta, \phi)}{r^2} \cdot \frac{1}{\psi(\theta)} \cdot r'^2 \cos\theta \cdot dr d\theta d\phi \right\} \cdot r'^2 \cos\theta' \cdot dr' d\theta' d\phi' \quad (10)$$

$$= Ts \cdot \int n(r', \theta', \phi') \cdot \left[ \frac{\frac{c\tau}{2} \cdot \psi(\theta') \cdot r'^2}{r'^2 \cdot \psi(\theta')} \right] \cdot r'^2 \cdot \cos\theta' dr' d\theta' d\phi'$$

$$= Ts \cdot \frac{c\tau}{2} \cdot \int n(r', \theta', \phi') \cdot r'^2 \cos\theta' \cdot dr' d\theta' d\phi'$$

$$= Ts \cdot \frac{c\tau}{2} \cdot N$$

The terms $1/r^2$ and $\psi(\theta)$ in the integral expression in equation (10) above are approximated by $1/r'^2$ and $\psi(\theta')$, respectively, which are placed outside of the integral expression of r, $\theta$ and $\phi$. Rewriting equation (10), we obtain equation (11) below:

$$N \cdot Ts = \frac{2}{c\tau} \int P_M^2(r, \theta, \phi) \cdot r^4(e^{2\alpha r})^2 \cdot \frac{1}{P_0^2(\theta)\psi(\theta)} \cos\theta \cdot dr d\theta d\phi \quad (11)$$

When the acoustic sounding beam emitted by the multi-beam scanning sonar system 1 is reflected by the fish school FS and echoes returning therefrom are received by the receiving beam, the scanning sonar system 1 obtains echo data along the direction of the receiving beam, that is, along the direction of range r in each $(\theta, \phi)$ direction. Assuming that a beam angle increment in the $\theta$ direction is $\Delta\theta$, a beam angle increment in the $\phi$ direction is $\Delta\phi$, and an output derived from an acoustic beam oriented in an (i, j) direction, that is, the direction having the ith value of $\theta$ and the jth value of $\phi$, is $P_{Mi,j}(r)$, equation (11) is rewritten as equation (12) below:

$$N \cdot Ts = \frac{2\Delta\theta \cdot \Delta\phi}{c\tau} \sum_i \sum_j \int_{Range} P_{MIJ}(r)^2 \cdot r^4(e^{2\alpha r})^2 \cdot \frac{1}{P_0^2(i\Delta\theta)\psi(i\Delta\theta)} \cos(i\Delta\theta) dr \quad (12)$$

The right side of equation (12) above represents echo integration. From equation (12), it is possible to obtain a value of integration with corrected values of $r^4 P_O^2 (e^2\alpha^r)^2$ and the angle $\theta$. When the value of Ts is known, it is possible to further obtain the total number N of fish from the value of echo integration. Introducing discretization in the range r direction, equation (12) can be rewritten as equation (13) below:

$$N \cdot Ts = \frac{2\Delta\theta \cdot \Delta\phi \cdot \Delta r}{c\tau} \sum_i \sum_j \sum_k P_{Mi,j,k}^2 \cdot (k\Delta r)^4 (e^{2\alpha k \Delta r})^2 \frac{1}{P_{02}(i\Delta\theta)\psi(i\Delta\theta)} \cos(i\Delta\theta) \quad (13)$$

The product N×Ts of the backscattering strength Ts of a typical single fish constituting the fish school FS and the number N of fish in the fish school FS can be calculated from equation (13) above based on the principle of fish quantity information calculation using the spherical coordinate system. Also, if the backscattering strength Ts of the typical single fish constituting the fish school FS is known, the number N of fish in the fish school FS can be calculated from equation (13). In this way, it is possible to obtain an approximate value of the number N of fish in the fish school FS.

EXAMPLE 1

Figure 4:
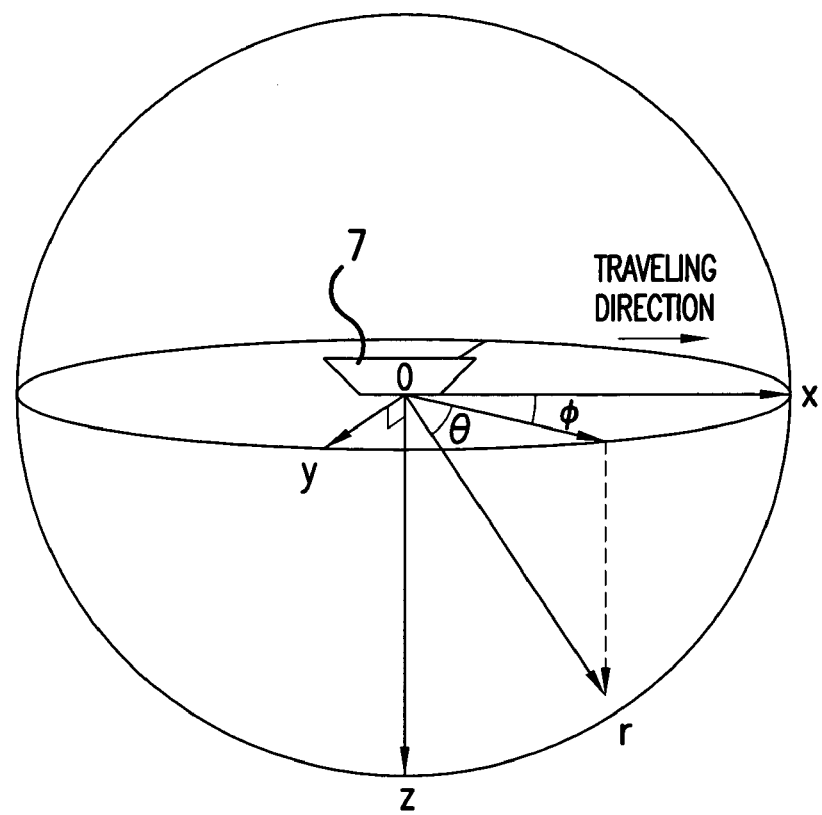
FIG. 4 is a graphical representation of how the acoustic sounding beam is transmitted and how return echoes are received in a single transmit-receive cycle of the invention for performing three-dimensional scanning.

Referring to now to FIG. 4, Example 1 of calculation based on the principle of fish quantity information calculation using the spherical coordinate system is described. FIG. 4 is a graphical representation of how the acoustic sounding beam is transmitted and how returning echoes are received in a single transmit-receive cycle for performing three-dimensional scanning. The scanning sonar system 1 of Example 1 is of a type that can perform three-dimensional scanning by a single transmit-receive cycle.

If three-dimensional scanning is performed by a single transmit-receive cycle and equivalent input sound intensities $P_M^2$ are determined by receiving the acoustic beam reflected from three-dimensional directions, it is possible to calculate the approximate number of fish contained in a fish school FS based on the aforementioned principle of calculating fish quantity information using the spherical coordinate system.

An algorithm used for calculating information on the fish quantity contained in a fish school is now explained in the following.

First, a range of measurement of the scanning sonar system 1, or a range of directions from which the acoustic beam is to be received, is set. The directions of receiving the acoustic beam are expressed in terms of θ(i), φ(j) and r(k). Here, the range of measurement in the angle θ direction is $0 \leq \theta \leq \pi/2$ (rad), the range of measurement in the angle φ direction is $0 \leq \phi \leq 2\pi$ (rad), and the range of measurement in the range r direction is $0 \leq r \leq$ (detectable range of acoustic beam) (m).

Next, upon receiving echoes returning from within the fish school FS due to reflection of the acoustic sounding beam transmitted in the three-dimensional directions by the receiving beam, the scanning sonar system 1 calculates a volume integral of equivalent input sound intensities $P_{Mi,j,k}^2$ obtained from individual (θ,φ) directions and individual range r directions, that is, the equivalent input sound intensities derived from individual volume elements. Equation (13) above is obtained if the transmit signal intensity is expressed by $P_O^2$. Therefore, it is possible to calculate an approximate value of the number N of fish in the fish school FS if the backscattering strength Ts of a typical single fish is known even when the transducer 2 has a cylindrical shape. The scanning sonar system 1 presents the approximate value of the number N of fish in the fish school FS thus calculated on the display section 6.

As seen above, the scanning sonar system 1 of Example 1 includes the transducer 2 for transmitting the acoustic sounding beam in the three-dimensions underwater from the hull bottom of the ship 7 every transmit-receive cycle, and receiving echoes returning from within the fish school FS due to reflection of the transmitted acoustic sounding beam useing the receiving beam which is steered in the three-dimensions, and the signal processing section 5 for processing signals picked up by the receiving beam. The signal processing section 5 calculates the approximate value of the number N of fish in the fish school FS by integrating the equivalent input sound intensities $P_{Mi,j,k}^2$ obtained by the receiving beam along the three-dimensional directions. This enables a fisherman to easily estimate the approximate value of the number N of fish in the fish school FS in a quantitative manner without the need to recognize a relationship between scanned images obtained in horizontal and vertical scan modes. Furthermore, the approximate value of the number N of fish in the fish school FS can be estimated with little variation regardless of the experience of individual fishermen with the scanning sonar system 1 of the invention.

EXAMPLE 2

Figure 5:
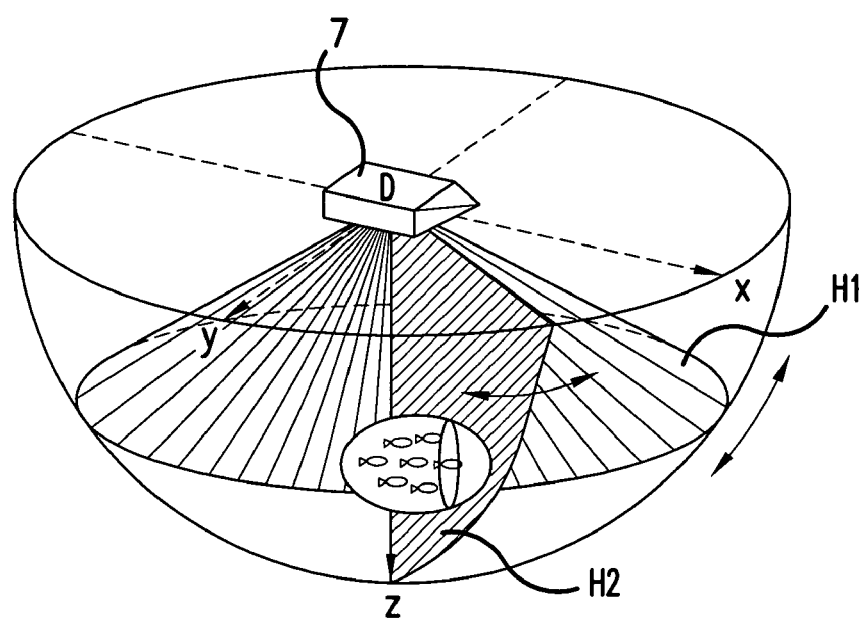
FIG. 5 is a diagram showing a model of scanning performed by the invention in which the acoustic sounding beam is steered along a substantially umbrella-shaped directional surface formed around a ship and along an substantially vertical planar directional surface perpendicular to an xy-plane.
Figure 6:
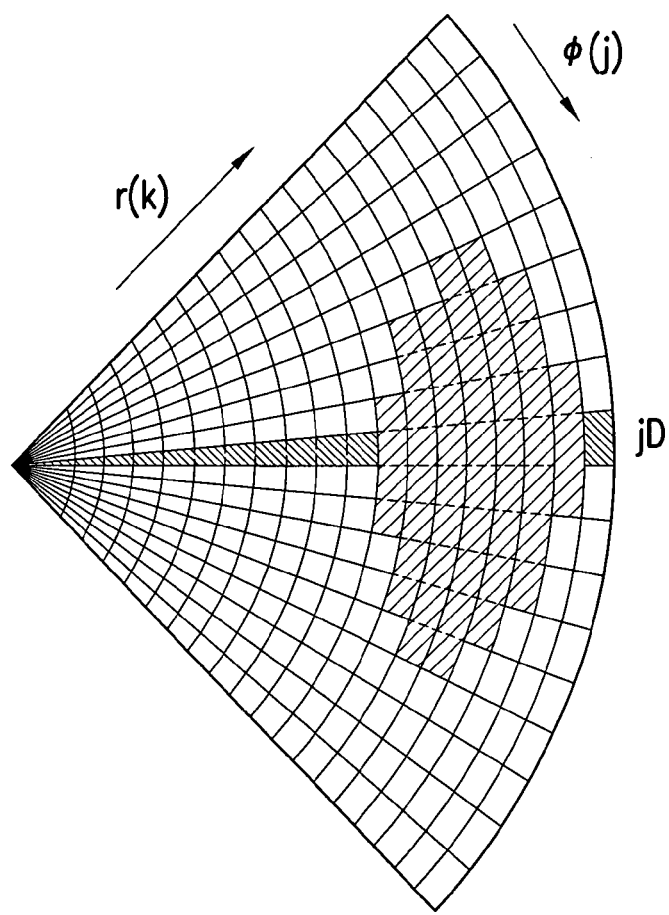
FIG. 6 is a diagram showing echo data obtained by the invention when the receiving beam is steered along the substantially umbrella-shaped directional surface.
Figure 7:
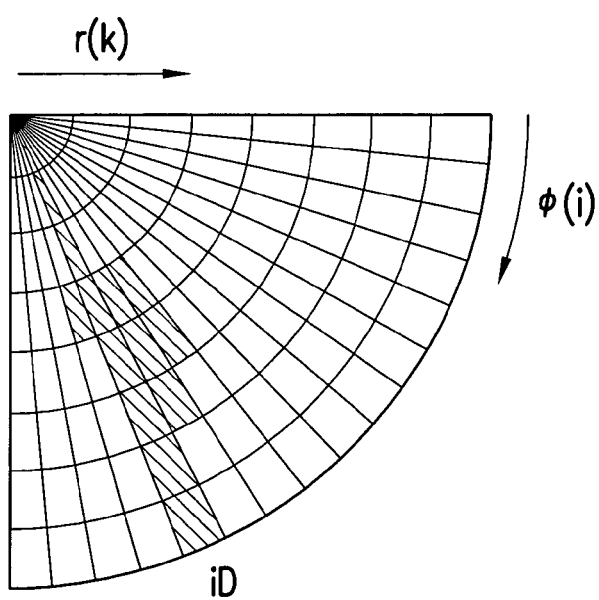
FIG. 7 is a diagram showing echo data obtained by the invention when the receiving beam is steered along the substantially vertical planar directional surface perpendicular to the xy-plane.

Referring now to FIGS. 5, 6 and 7, Example 2 of calculation is described. FIG. 5 is a diagram showing a model of scanning in which the acoustic sounding beam is steered along a plurality of directional surfaces that intersect in three dimensions. These directional surfaces include a substantially umbrella-shaped directional surface H1 formed around the ship 7 and a substantially vertical planar directional surface H2 perpendicular to the xy-plane. FIG. 6 is a diagram showing echo data obtained when the receiving beam is steered along the substantially umbrella-shaped directional surface H1. FIG. 7 is a diagram showing echo data obtained when the receiving beam is steered along the substantially vertical planar directional surface H2 perpendicular to the xy-plane. The echo data shown in FIGS. 6 and 7 represent equivalent input sound intensities $P_M^2$ obtained by the receiving beam. The larger the equivalent input sound intensity $P_M^2$ obtained by the receiving beam, the denser are the echo data painted in FIGS. 6 and 7. The transducer 2 of the scanning sonar system 1 of Example 2 has a spherical shape in this non-limiting example.

As shown in FIG. 5, the acoustic sounding beam transmitted underwater from the transducer 2 is steered in two angular directions. These two angular directions are a direction in which the angle φ the sounding beam makes with the xz-plane (which is varied while scanning along the two-dimensional imaginary umbrella-shaped surface H1 formed around the ship 7) and a direction in which the angle θ the sounding beam makes with the xy-plane (which is also varied while scanning along the imaginary vertical plane H2 perpendicular to the xy-plane). As previously mentioned, the range of the angle φ the sounding beam makes with the xz-plane is $0 \leq \theta \leq 2\pi$ (rad) and the range of the angle θ the sounding beam makes with the xy-plane is $0 \leq \theta \leq \pi/2$ (rad).

When equivalent input sound intensities $P_M^2$ are obtained by the receiving beam with the acoustic sounding beam steered along the substantially umbrella-shaped directional surface H1 and the substantially vertical planar directional surface H2, it is possible to calculate the approximate number of fish contained in a fish school FS based on the aforementioned principle of calculating fish quantity information and a pseudo-layer-stacking method. The pseudo-layer-stacking method is described below with reference to FIGS. 8A and 8B.

Figure 8A:
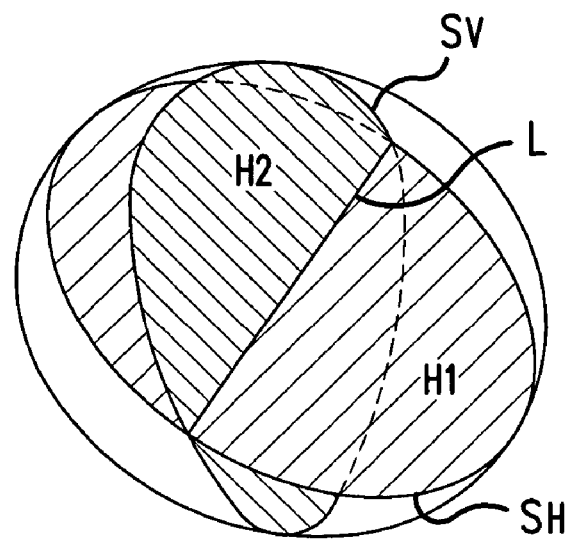
FIG. 8A is a diagram according to the invention showing cross sections of a fish school cut by the substantially umbrella-shaped directional surface formed around the ship and the substantially vertical planar directional surface perpendicular to the xy-plane.
Figure 8B:
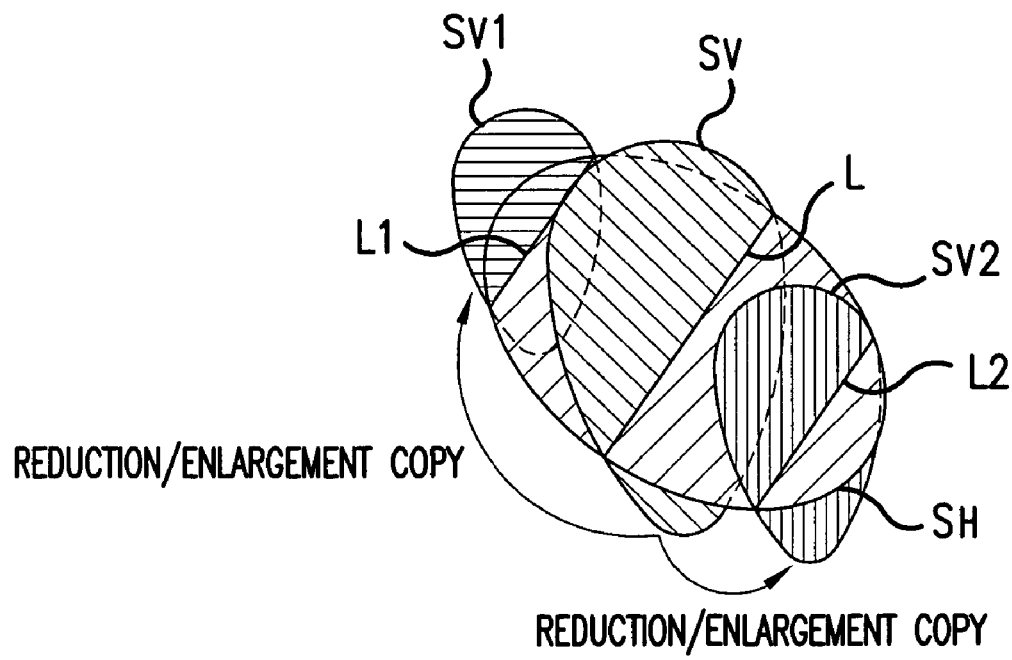
FIG. 8B is a conceptual diagram illustrating a pseudo-layer-stacking method according to the invention.

FIG. 8A is a diagram showing cross sections of the fish school FS cut by the substantially umbrella-shaped directional surface H1 formed around the ship 7 and the substantially vertical planar directional surface H2 perpendicular to the xy-plane. The acoustic sounding beam is transmitted in directions along the substantially umbrella-shaped directional surface H1 and in directions along the substantially vertical planar directional surface H2 perpendicular to the xy-plane. FIG. 8B is a conceptual diagram illustrating the pseudo-layer-stacking method.

As shown in FIG. 8A, the cross sections of the fish school FS on both the substantially umbrella-shaped directional surface H1 and the substantially vertical planar directional surface H2 are traced to produce non-elliptical models $S_H$ and $S_V$, respectively. Next, the non-elliptical model $S_V$ formed on the substantially vertical planar directional surface H2 is copied in enlarged or reduced size along the substantially umbrella-shaped directional surface H1 to produce non-elliptical models $S_V1$, $S_V2$, and so on, whereby pseudo-three-dimensional data is constructed. The scale of copying is determined by the ratio between the value of an integral of equivalent input sound intensities $P_M^2$ taken along a line L of intersection of the non-elliptical models $S_H$ and $S_V$ and the value of an integral of equivalent input sound intensities $P_M^2$ taken along a line L1 (L2, . . . ) on the non-elliptical model $S_H$, the line L1 (L2, . . . ) being obtained by shifting the line L along the substantially umbrella-shaped directional surface H1 about the origin O (see FIG. 5) in a direction (i.e., j direction) in which the angle φ increases or decreases (see FIG. 8B). Specifically, the non-elliptical model $S_V1$ is a model obtained by shifting the non-elliptical model $S_V$ along the non-elliptical model $S_H$ about the origin O and reducing the non-elliptical model $S_V$ in such a way that the value of the integral of equivalent input sound intensities $P_M^2$ taken along the line L of intersection of the non-elliptical models $S_H$ and the shifted non-elliptical model $S_V$ becomes equal to the value of the integral of equivalent input sound intensities $P_M^2$ taken along the line L1. The non-elliptical model $S_V2$ is also produced in a similar fashion.

Here, the scale of copying is not limited to the above definition. As an alternative, the scale of copying may be determined by the ratio between the length of the line L of intersection of the non-elliptical models $S_H$ and $S_V$ and the length of the line L1 (L2, . . . ) on the non-elliptical model $S_H$, the line L1 (L2, . . . ) being obtained by shifting the line L along the substantially umbrella-shaped directional surface H1 (see FIG. 5) in the direction (i.e., j direction) in which the angle φ increases or decreases.

Also, the pseudo-three-dimensional data need not necessarily be constructed by producing the non-elliptical models $S_V1$, $S_V2$, and so on by copying the non-elliptical model $S_V$ formed on the substantially vertical planar directional surface H2 in enlarged or reduced size along the substantially umbrella-shaped directional surface H1. The pseudo-three-dimensional data may be constructed, for example, by producing the non-elliptical models $S_H1$, $S_H2$, and so on by copying the non-elliptical model $S_H$ formed on the substantially umbrella-shaped directional surface H1 in enlarged or reduced size along the substantially vertical planar directional surface H2.

An algorithm for calculating an approximate value of the number N of fish in the fish school FS based on the aforementioned pseudo-layer-stacking method is now explained in the following.

First, a range of measurement of the scanning sonar system 1, or a range of directions in and from which the acoustic beam is to be transmitted and received, is set. The directions of transmitting and receiving the acoustic beam are expressed in terms of θ(i), φ(j) and r(k). Here, the range of measurement in the angle θ direction is 0≦θ≦π/2 (rad), the range of measurement in the angle φ direction is 0≦φ≦/ 2π (rad), and the range of measurement in the range r direction is 0≦r≦(detectable range of acoustic beam) (m).

The display section 6 presents the equivalent input sound intensities $P_M^2$ obtained by the receiving beam which is formed along the substantially umbrella-shaped directional surface H1 and the substantially vertical planar directional surface H2 in the form of echo data painted in darker and lighter shades as illustrated in FIGS. 6 and 7, respectively.

The equivalent input sound intensities $P_M^2$ obtained by the receiving beam formed along the substantially umbrella-shaped directional surface H1 are integrated along the depth direction for the receiving beam oriented in each direction (one-dimensional echo integration). Since the transducer 2 has a cylindrical shape in this example, the value of this integration is expressed by equation (14) below:

$$R_i = \sum_k P_{MiO,jk}^2 \cdot (k\Delta r)^4 (e^{2\alpha k\Delta r})^2 \frac{1}{P_0^2(i_0\Delta\theta)\psi(i_0\Delta\theta)} \cos(i_0\Delta\theta) \quad (14)$$

Also, the equivalent input sound intensities $P_M^2$ obtained by the receiving beam formed in directions along the substantially vertical planar directional surface H2 are integrated (two-dimensional echo integration) and the result is multiplied by a unit element. The value of this integration is expressed by equation (15) below:

$$S_0 = \sum_j \sum_k P_{MI,IO,K}^2 \cdot (k\Delta r)^4 (e^{2\alpha k\Delta r})^2 \frac{1}{P_0^2(i\Delta\theta)\psi(i\Delta\theta)} \cos(i\Delta\theta) \quad (15)$$

where $P_{Mi,j,k}^2$ represents equivalent input sound intensities derived from individual volume elements (r, θ, φ) and $P_O^2$ represents the transmit signal intensity.

Using these values of integration, the signal processing section 5 constructs the pseudo-three-dimensional data by the aforementioned pseudo-layer-stacking method. The pseudo-three-dimensional data thus constructed is expressed by equation (16) below, and equation (17) below is derived by applying the aforementioned principle of fish quantity calculation:

$$T = \sum_j s_0 \cdot \left[\frac{R_1}{R_{i0}}\right]^2 \quad (16)$$

$$N \cdot Ts = \frac{2\Delta\theta \cdot \Delta\phi \cdot \Delta r}{cr} \cdot T \quad (17)$$

Accordingly, if the backscattering strength Ts of a typical single fish is known, it is possible to calculate an approximate value of the number N of fish in the fish school FS. The scanning sonar system 1 presents the approximate value of the number N of fish in the fish school FS thus calculated on the display section 6 as in Example 1.

While the invention has been described with reference to the first embodiment as one preferred arrangement for calculating the fish quantity information about the fish school FS, the invention is not limited to the foregoing first embodiment but may be varied in various ways within the scope of the appended claims. For example, the invention is not limited to the above-described arrangement in which the transducer 2 transmits and receives the acoustic beam which is steered along both the substantially umbrella-shaped directional surface H1 and the substantially vertical planar directional surface H2 in a single transmit-receive cycle, but the transducer 2 may be of a type which successively transmits and receives multiple acoustic beams to scan the substantially umbrella-shaped directional surface H1 and the substantially vertical planar directional surface H2.

Also, although the scanning sonar system 1 of the first embodiment calculates the number N of fish in the fish school FS as the fish quantity information about the fish school FS, the invention is not limited to this arrangement. Alternatively, the scanning sonar system 1 may be of a type that calculates N×Ts as the fish quantity information.

Also, although the scanning sonar system 1 of the first embodiment forms, or steers, the single receiving beam in each successive direction along the substantially umbrella-shaped directional surface H1 and the substantially vertical planar directional surface H2, the invention is not limited to this arrangement. As an alternative, the scanning sonar system 1 may be of a type which simultaneously forms a large number of narrow receiving beams oriented in individual directions along the substantially umbrella-shaped directional surface H1 and the substantially vertical planar directional surface H2.

Furthermore, although the directions of transmitting and receiving the sounding beam are defined such that the range of the angle θ the sounding beam makes with the xy-plane is 0≦θ≦π/2 (rad) and the range of the angle φ the sounding beam makes with the xz-plane is 0≦φ≦2π (rad) in the foregoing discussion, the invention is not limited to this arrangement. As an alternative, the scanning sonar system 1 may be of a type which can vary the directions of transmitting and receiving the sounding beam to cover arbitrarily defined ranges of the angle θ and the angle φ within the ranges of 0≦θ≦π/2 (rad) and 0≦φ≦2π (rad), e.g., π/4≦θ≦3π/4 (rad) and 0≦φ≦π (rad), respectively.

Moreover, while the invention has thus far been discussed with reference to the specific example in which the transducer 2 has a cylindrical shape, the invention is not limited to this example but the transducer 2 may be of type having, for example, a spherical shape. In this case (where the transducer 2 has a spherical shape), it is necessary to take into consideration dependency of the transmit signal intensity $P_O^2$ and the equivalent beam width $\psi$ on the angle $\theta$ the r direction makes with the xy-plane. Thus, in this case, equations (14), (15) and (16) are rewritten as equations (18), (19) and (20) below, respectively:

$$R_i = \sum_k P_{M,i,j,k}^2 \cdot (k\Delta r)^4 \cdot (e^{2\alpha k \Delta r})^2 \cdot \cos(i_0 \Delta \theta) \tag{18}$$

$$S_0 = \sum_i \sum_k P_{M,i,j,k}^2 \cdot (k\Delta r)^4 \cdot (e^{2\alpha k \Delta r})^2 \cdot \cos(i\Delta \theta) \tag{19}$$

$$N \cdot Ts = \frac{2\Delta\theta \cdot \Delta\phi \cdot \Delta r}{cr} \cdot \frac{1}{P_0^2 \psi} \cdot T \tag{20}$$

where $P_O^2$ represents the transmit signal intensity and $\psi$ represents the equivalent beam width.

As seen above, the scanning sonar system 1 of Example 2 includes the transducer 2 for transmitting the acoustic sounding beam in specified directions underwater from the hull bottom of the ship 7 and receiving echoes returning from within the fish school FS due to reflection of the transmitted acoustic sounding beam by means of the receiving beam, and the signal processing section 5 for processing signals picked up by the receiving beam. Here, the transducer 2 can form the receiving beam in directions along the substantially vertical planar directional surface H2 perpendicular to the xy-plane and in directions intersecting both the xy-plane and the substantially vertical planar directional surface H2 and taken along the substantially umbrella-shaped directional surface H1 formed around the ship 7. The signal processing section 5 constructs the pseudo-three-dimensional data based on the equivalent input sound intensities $P_M^2$ obtained by the receiving beam formed in the directions along the substantially vertical planar directional surface H2 and the equivalent input sound intensities $P_M^2$ obtained by the receiving beam formed in the directions along the substantially umbrella-shaped directional surface H1, and calculates the approximate value of the number N of fish in the fish school FS. This enables a fisherman to easily estimate the approximate value of the number N of fish in the fish school FS in a quantitative manner without the need to recognize the relationship between scanned images obtained in the horizontal and vertical scan modes. Furthermore, the approximate value of the number N of fish in the fish school FS can be estimated with little variation regardless of experience of individual fishermen with the scanning sonar system 1 of the invention.

Second Embodiment

Figure 9:
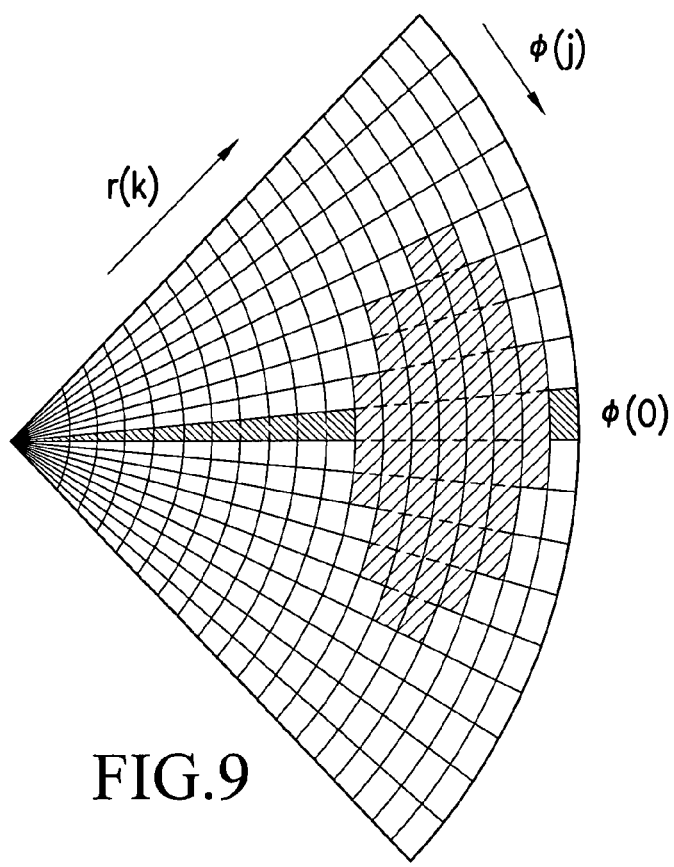
FIG. 9 is a diagram showing echo data obtained when the receiving beam is steered along the substantially umbrella-shaped directional surface.
Figure 10:
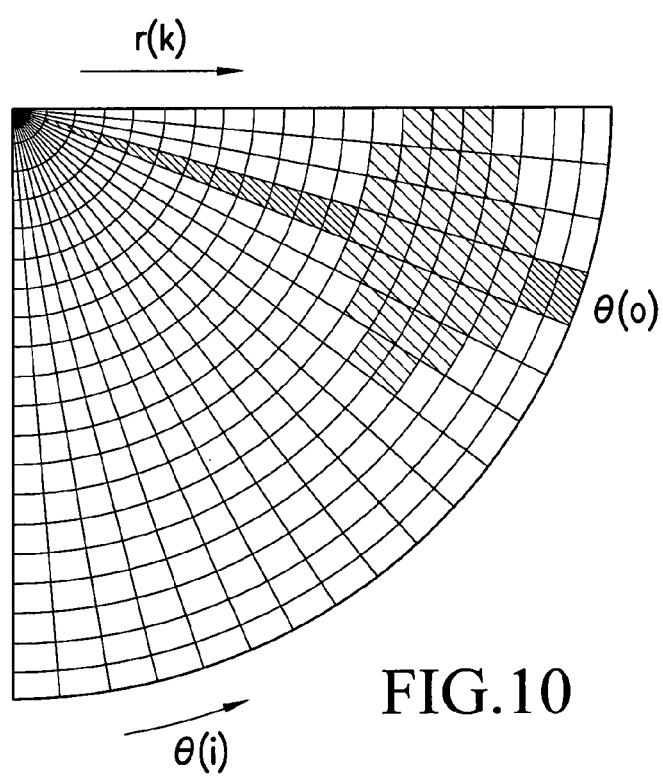
FIG. 10 is a diagram showing echo data obtained by the invention when the receiving beam is steered along the substantially vertical planar directional surface perpendicular to the xy-plane.

According to the invention, it is possible to estimate the approximate volume of a fish school FS by the pseudo-layer-stacking method discussed in the first embodiment. The second embodiment of the invention is now described with reference to FIGS. 5, 9 and 10. FIG. 9 is a diagram showing echo data obtained when the receiving beam is steered along the substantially umbrella-shaped directional surface H1 shown in FIG. 5. FIG. 10 is a diagram showing echo data obtained when the receiving beam is steered along the substantially vertical planar directional surface H2 shown in FIG. 5. The echo data shown in FIGS. 9 and 10 represent equivalent input sound intensities $P_M^2$ obtained by the receiving beam.

In this invention, the umbrella-shaped surface H1 and the imaginary vertical plane H2 shown in FIG. 5 intersect each other at $\theta(0)$ and $\phi(0)$. Assuming that the fish school FS is a volume scatterer having a distinct boundary and has a spreading range sufficiently larger than reverberation volume, the volume of the fish school FS can be approximated by a fish school volume estimation algorithm which is explained in the following.

First, a range of directions in and from which the acoustic beam is to be transmitted and received is set for each of the r, $\theta$ and $\phi$ directions. The directions of transmitting and receiving the acoustic beam are expressed in terms of $\theta(i)$, $\phi(j)$ and $r(k)$. Here, the range of measurement in the angle $\theta$ direction is $0 \leq \theta \leq \pi/2$ (rad), the range of measurement in the angle $\phi$ direction is $0 \leq \phi \leq 2\pi$ (rad), and the range of measurement in the range r direction is $0 \leq r \leq$ (detectable range of acoustic beam) (m).

The display section 6 presents the equivalent input sound intensities $P_M^2$ obtained by the receiving beam which is formed along the substantially umbrella-shaped directional surface H1 and the substantially vertical planar directional surface H2 in the form of echo data painted in darker and lighter shades as illustrated in FIGS. 9 and 10, respectively. The equivalent input sound intensities $P_M^2$ can be calculated by equation (2) if the shape of the transducer 2 is spherical, equation (9) if the shape of the transducer 2 is cylindrical.

The signal processing section 5 binarizes equivalent input sound intensities $P_M^2$ obtained by the receiving beam formed in directions along the substantially umbrella-shaped directional surface H1 from individual volume elements in the r and $\phi$ directions by comparing the equivalent input sound intensities $P_M^2$ with a predetermined threshold. Specifically, the signal processing section 5 sets a binary value $D_{iO,j,k}=1$ for a volume element if the equivalent input sound intensity $P_M^2$ derived from the pertinent volume element is equal to or greater than the threshold, whereas the signal processing section 5 sets a binary value $D_{iO,j,k}=0$ for a volume element if the equivalent input sound intensity $P_M^2$ derived from this volume element is less than the threshold.

Likewise, the signal processing section 5 binarizes equivalent input sound intensities $P_M^2$ obtained by the receiving beam formed in directions along the substantially vertical planar directional surface H2 from individual volume elements in the r and $\theta$ directions by comparing the equivalent input sound intensities $P_M^2$ with the predetermined threshold. The signal processing section 5 sets a binary value $D_{i,jO,k}=1$ for a volume element if the equivalent input sound intensity $P_M^2$ derived from the pertinent volume element is equal to or greater than the threshold, whereas the signal processing section 5 sets a binary value $D_{i,jO,k}=0$ for a volume element if the equivalent input sound intensity $P_M^2$ derived from this volume element is less than the threshold.

Referring to FIG. 9, the signal processing section 5 integrates the binary values of those regions for which $D_{iO,j,k}=1$ has been set along the depth direction for the acoustic beam oriented in each angle $\phi$ direction (one-dimensional integration). The value $R_j'$ of this integration is expressed by equation (21) below:

$$R_j' = \sum_k D_{iO,j,k} \tag{21}$$

Referring to FIG. 10, the signal processing section 5 integrates the binary values of those regions for which $D_{i,jO,k}=1$ has been set along the substantially vertical planar directional surface H2 and multiplies the result of this integration by the number of unit elements. The value $V_0$ of this integration is expressed by equation (22) below:

$$V_0 = \sum_i \sum_k D_{i,j,0,k} \cdot (k\Delta r)^2 \cdot \Delta r \cdot \Delta \theta \cdot \Delta \phi \cdot \cos(i\Delta\theta) \quad (22)$$
$$= \Delta r^3 \cdot \Delta \theta \cdot \Delta \phi \cdot \sum_i \sum_k D_{i,j,0,k} \cdot k^2 \cdot \cos(i\Delta\theta)$$

Using these values $R_j'$, $V_0$ of integration, the signal processing section 5 constructs pseudo-three-dimensional data by the aforementioned pseudo-layer-stacking method and calculates an approximate value of the volume V of the fish school FS by equation (23) below:

$$v = \sum_j v_0 \cdot \left[\frac{R_l'}{R_{l0}'}\right]^2 \quad (23)$$

It is therefore possible to calculate the approximate volume V of the fish school FS from the equivalent input sound intensities $P_M^2$ obtained from echoes reflected by the fish school FS and picked up by the receiving beam.

The scanning sonar system 1 generates a pseudo-three-dimensional picture of the fish school FS from fish echoes extracted therefrom by applying a volume rendering technique to the pseudo-three-dimensional data thus constructed and presents the pseudo-three-dimensional picture on the display section 6.

Figure 11:
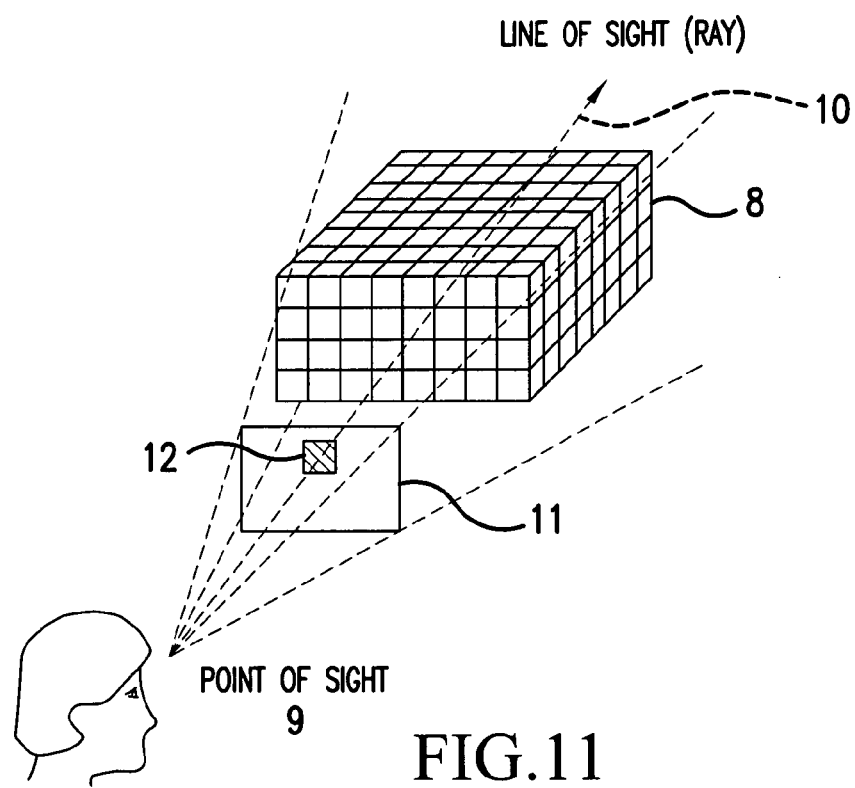
FIG. 11 is a diagram according to the invention showing how a three-dimensional orthogonal mesh model is projected on a two-dimensional projection plane.
Figure 12:
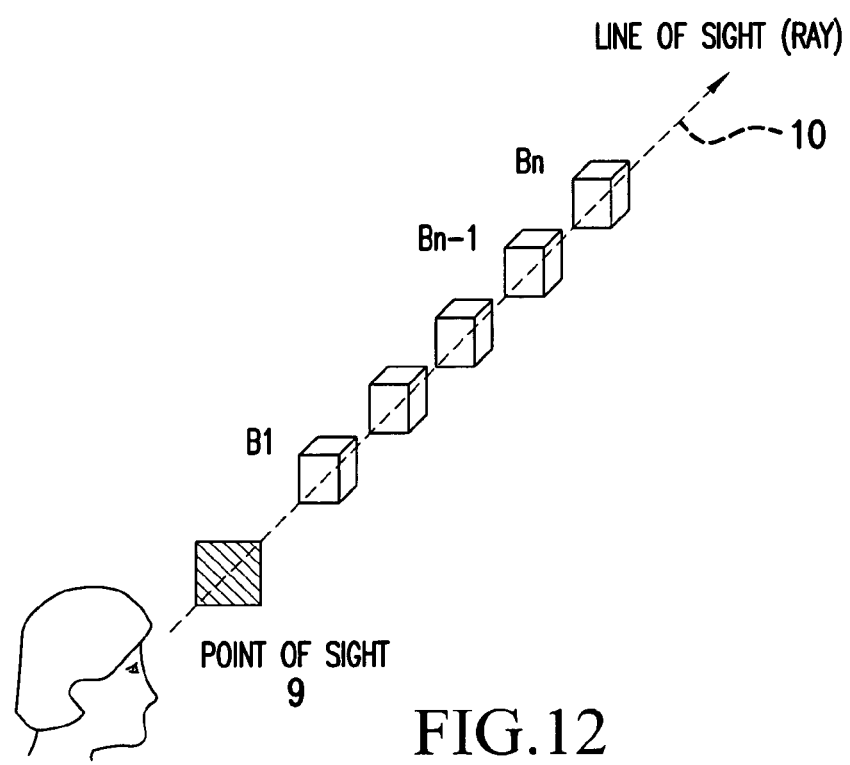
FIG. 12 is a diagram according to the invention showing a series of voxels located on a ray (line of sight) drawn from a viewpoint.

Volume rendering presentation shows an image of not only the surface but also the interior of a fish school by using opacity information. The volume rendering technique employed in the present embodiment is explained with reference to FIGS. 11 and 12. FIG. 11 is a diagram showing how a three-dimensional orthogonal mesh model 8 is projected on a two-dimensional projection plane 11, and FIG. 12 is a diagram showing a series of voxels B1-Bn located on a ray (line of sight) 10 drawn from a viewpoint 9. Here, a voxel, likened to a pixel meaning each picture element of a two-dimensional image, refers to each three-dimensional mesh segment of the orthogonal mesh model 8.

Assuming that the orthogonal mesh model 8 containing fish school data is viewed from the viewpoint 9 through the projection plane 11 as illustrated in FIG. 11, the scanning sonar system 1 integrates color data Cv of the individual voxels B1-Bn intersected by the ray 10 as illustrated in FIG. 12. A value obtained by integrating the color data Cv is color data (hereinafter referred to as projected color data C) assigned to a pixel 12 on the projection plane 11 intersected by the ray 10. Thus, a ray 10 passing from the viewpoint 9 through a pixel 12 at an upper end of the projection plane 11 is specified as a stating point of scanning, and the direction of this ray 10 is calculated. Then, a readout point (i.e., a distance measured in a straight line from the viewpoint) is updated along the ray 10 and volume rendering data of the voxel corresponding to the readout point thus updated is read out.

The projected color data C is calculated by integrating the color data Cv in a manner described below. If only one voxel B1 having color data Cv(1) and opacity $\alpha(1)$ exists on the ray 10, for example, the projected color data C observed from the viewpoint 9 is given by equation (24) below:

$$C = Cv(1) \cdot \alpha(1) \quad (24)$$

If the voxel B1 having color data Cv(1) and opacity $\alpha(1)$ and the voxel B2 having color data Cv(2) and opacity $\alpha(2)$ exist on the ray 10, the projected color data C observed from the viewpoint 9 is given by formula (25) below:

$$C \leftarrow C + Cv(2) \cdot \alpha(2) \cdot (1-\alpha(1)) \quad (25)$$

In the right side of formula (25) above, C represents the projected color data of the voxel B1 obtained by equation (24) and $Cv(2) \cdot (1-\alpha(1))$ represents the projected color data of the voxel B2 having the color data Cv(2) as viewed through the voxel B1 having the opacity $\alpha(1)$. Therefore, the projected color data C of the voxels B1 to Bn are given by recurrence formula (26) below:

$$C \leftarrow C + (1-\alpha(t-1)) \cdot Cv(t) \cdot \alpha(t) \quad (26)$$

While integrating the color data Cv to obtain the projected color data C, the scanning sonar system 1 integrates opacity values as well. The scanning sonar system 1 integrates the color data Cv until the opacity reaches 1, beyond which voxels in the background become invisible. When the opacity reaches 1 or the color data Cv of all the voxels on the ray 10 have been integrated, the scanning sonar system 1 stops further integrating the color data Cv of any voxels on the same ray 10. The scanning sonar system 1 stores the projected color data C so far obtained for the current ray 10 by integrating the color data Cv as data of the relevant pixel 12. Then, the scanning sonar system 1 switches the ray 10 to a direction passing through a next pixel 12. The scanning sonar system 1 calculates this updated ray direction and performs the same scanning operation as discussed above.

Data necessary for volume rendering presentation of a fish school is completed by allocating the projected color data C to individual pixels 12 of the projection plane 11 in the aforementioned manner.

Mathematical operations for the volume rendering presentation are performed by a controller (not shown) which may include a central processing unit (CPU), a read-only memory (ROM) and a random-access memory (RAM). The controller may control the entirety of the scanning sonar system 1 or only the display section 6.

While the invention has been described with reference to the second embodiment as one preferred arrangement for calculating the approximate volume V of the fish school FS, the invention is not limited to the foregoing second embodiment but may be varied in various ways within the scope of the appended claims. For example, although the directions of transmitting and receiving the sounding beam are defined such that the range of the angle θ the sounding beam makes with the xy-plane is $0 \leq \theta \leq \pi/2$ (rad) and the range of the angle φ the sounding beam makes with the xz-plane is $0 \leq \phi \leq 2\pi$ (rad) in the foregoing discussion, the invention is not limited to this arrangement. As an alternative, the scanning sonar system 1 may be of a type which can vary the directions of transmitting and receiving the sounding beam to cover arbitrarily defined ranges of the angle θ and the angle φ within the ranges of $0 \leq \theta \leq \pi/2$ (rad) and $0 \leq \phi \leq 2\pi$ (rad), e.g., $\pi/4 \leq \theta \leq 3\pi/4$ (rad) and $0 \leq \phi \leq \pi$ (rad), respectively.

As seen above, the scanning sonar system 1 of the second embodiment includes the transducer 2 for transmitting the acoustic sounding beam in specified directions underwater from the hull bottom of the ship 7 and receiving echoes returning from within the fish school FS due to reflection of the transmitted acoustic sounding beam by means of the receiving beam, and the signal processing section 5 for processing signals picked up by the receiving beam. Here, the transducer 2 can form the receiving beam in directions along the substantially vertical planar directional surface H2 perpendicular to the xy-plane and in directions intersecting both the xy-plane and the substantially vertical, planar directional surface H2 and taken along the substantially umbrella-shaped directional surface H1 formed around the ship 7. The signal processing section 5 constructs the pseudo-three-dimensional data by binarizing the equivalent input sound intensities $P_M^2$ obtained by the receiving beam formed in the directions along the vertical planar surface H2 and the equivalent input sound intensities $P_M^2$ obtained by the receiving beam formed in the directions along the substantially umbrella-shaped directional surface III by comparing the respective equivalent input sound intensities $P_M^2$ with the predetermined threshold. Using the pseudo-three-dimensional data thus constructed, the signal processing section 5 calculates the approximate value of the volume V of the fish school FS. This enables a fisherman to easily estimate the approximate value of the volume V of the fish school FS without the need to recognize the relationship between scanned images obtained in the horizontal and vertical scan modes. Furthermore, the approximate value of the volume V of the fish school FS can be estimated with little variation regardless of the experience of individual fishermen with the scanning sonar system 1 of the invention. In addition, since the scanning sonar system 1 of the second embodiment presents a three-dimensional image of the fish school FS on the display section 6, the fisherman can easily recognize the shape of the fish school FS.

Although the foregoing discussion of the first and second embodiments is based on the assumption that the acoustic sounding beam is transmitted along the substantially umbrella-shaped directional surface H1 and the substantially vertical planar directional surface H2 perpendicular to the xy-plane, the scanning sonar system 1 scans approximately along the substantially umbrella-shaped directional surface H1 and the substantially vertical planar directional surface H2 in actuality.

Third Embodiment

Now, a principle of calculating the backscattering strength Ts of a typical single fish constituting the fish school FS is described with reference to FIGS. 3A and 3B. The foregoing discussion of the first embodiment is based on the assumption that the backscattering strength Ts of a typical single fish constituting the fish school FS is already known.

The backscattering strength Ts of a typical single fish constituting the fish school FS is, however, unknown in certain cases. The scanning sonar system 1 of the present invention is useful for determining the backscattering strength Ts of the typical single fish constituting the fish school FS in such cases. It is assumed that the transducer 2 of the scanning sonar system 1 of this embodiment has a spherical shape.

The backscattering strength Ts of a single fish (target) can be obtained by receiving an echo returning from the single fish due to reflection of a transmitted acoustic sounding beam by a receiving beam. For this purpose, it is necessary to know sensitivity $h(r', \theta', \phi'; r, \theta, \phi)$ for a given target location from a positional relationship between the target and an acoustic axis within the receiving beam. Incidentally, it is not possible to know sensitivity for a target location in $\theta$ and $\phi$ directions with a vertically sounding fish-finding echo sounder, because this type of fish-finding echo sounder can receive the acoustic beam only vertically from beneath the ship 7. With the scanning sonar system 1 of the invention, however, it is possible to determine the backscattering strength Ts of a single fish by calculating a volume integral of a beam in which the target exists, since the scanning sonar system 1 can produce not only a vertical acoustic beam oriented down beneath the ship 7 but also a sufficiently large number of acoustic beams in $(\theta, \phi)$ directions.

Figure 13A:
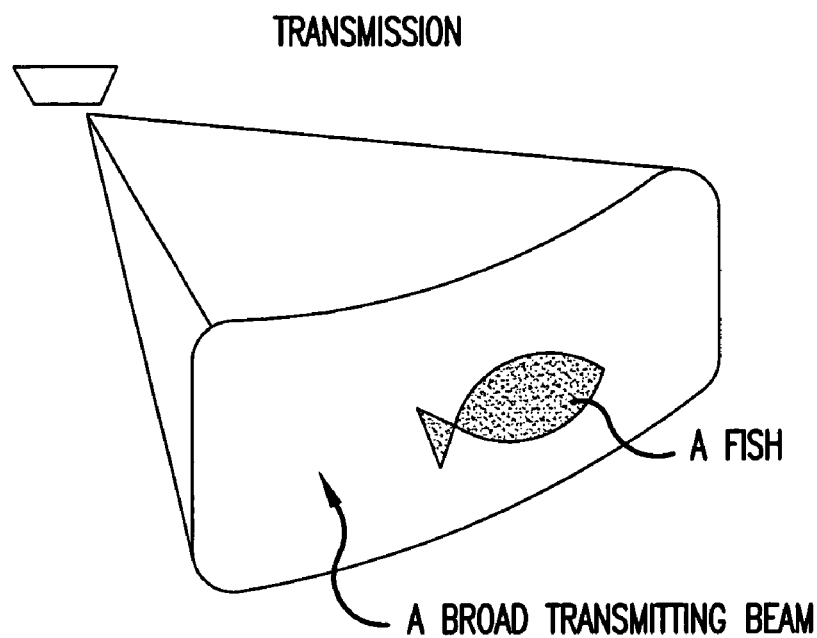
FIGS. 13a and 13b are illustrative examples of the scanning sonar beam pattern that may be used by invention.
Figure 13B:
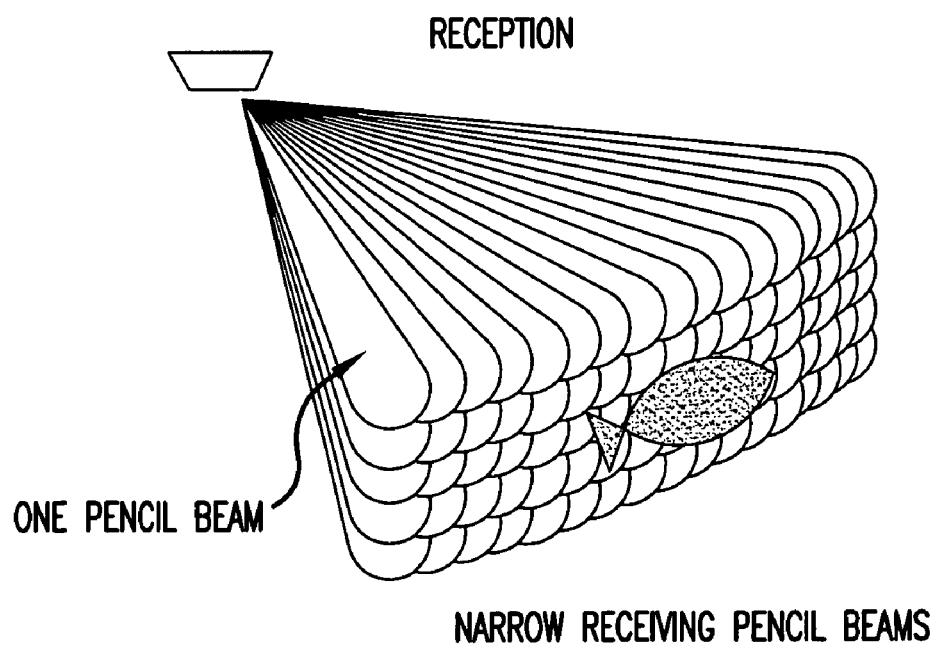

One illustrative example of the scanning sonar beam pattern that may be used by invention is shown in FIGS. 13a and 13b. More particularly, FIG. 13a shows a broad transmitting beam that is transmitted in a specific direction towards the single fish. The transmitting beam may have an angular extent in both the $(\theta, \phi)$ directions as shown. The receiving beams, in this example, are a plurality of pencil-like receiving beams that are respectively oriented in directions corresponding to the direction of the transmitting beam.

When the scanning sonar system 1 successively scans a point target is in $(\theta, \phi)$ directions as shown in FIG. 3A, the scanning sonar system 1 outputs received data having a specific volume as shown in FIG. 3B. Equivalent input sound intensities $P_M^2$ obtained by sounding a single fish located at a point $(r', \theta', \phi')$ are expressed by equation (27) below:

$$P_M^2(r', \theta', \phi'; r, \theta, \phi) = Ts \cdot \frac{P_0^2}{r^4}(e^{-2\alpha r})^2 \cdot h(r', \theta', \phi'; r, \theta, \phi) \qquad (27)$$

Multiplying the aforementioned equation (27) by $r^4 P_O^2 (e^2\alpha^r)^2$ and integrating the result, we obtain equation (28) below:

$$\int P^2(r', \theta', \phi'; r, \theta, \phi) \cdot r^2 (e^{2\alpha r})^2 \cdot r^2 \cos\theta \cdot dr d\theta d\phi = Ts \cdot P_0^2 \cdot \int \frac{h(r', \theta', \phi'; r, \theta, \phi)}{r^2} \cdot r^2 \cos\theta \cdot dr d\theta d\phi \qquad (28)$$

$$= Ts \cdot P_0^2 \cdot \frac{1}{r'^2} \cdot \int h(r', \theta', \phi'; r, \theta, \phi) \cdot r^2 \cdot \cos\theta \cdot dr d\theta d\phi$$

$$= Ts \cdot P_0^2 \cdot \frac{1}{r'^2} \cdot r'^2 \cdot \frac{cr}{2}\psi$$

$$= Ts \cdot P_0^2 \cdot \frac{1}{r'^2} \cdot Vh(r')$$

$$= Ts \cdot P_0^2 \cdot \frac{cr}{2}\psi$$

Thus, it is possible to calculate the backscattering strength Ts of a single fish from the equivalent input sound intensities $P_M^2$ of the acoustic beam reflected by the single fish. The aforementioned mathematical operation is performed by the signal processing section 5 and the calculated backscattering strength Ts may be indicated on the display section 6.

While the principle of calculating the backscattering strength Ts of a typical single fish constituting the fish school FS has been described with reference to a specific example, the invention is not limited to the aforementioned example of the third embodiment but may be varied in various ways within the scope of the appended claims. For example, although the principle of calculating the backscattering strength Ts of the single fish has been discussed on the assumption that the transducer 2 has a spherical shape in the foregoing, the principle of calculation is not limited to this example but is applicable even when the transducer 2 has a cylindrical shape. In the latter case, it is necessary to take into consideration the dependency of the transmit signal intensity $P_O^2$ and the equivalent beam width $\psi$ on the angle $\theta$ the r direction makes with the xy-plane. In this case (where the transducer 2 has a cylindrical shape), expressing the transmit signal intensity as $P_O^2(\theta)$ and the equivalent beam width as $\psi(\theta)$, equations (27) and (28) are rewritten as equations (29) and (30) below:

$$P_M^2(r, \theta, \phi) = Ts \cdot \frac{P_0(\theta)^2}{r^4} \cdot (e^{-2\alpha r})^2 \cdot h(r', \theta', \phi'; r, \theta, \phi) \quad (29)$$

$$\int P^2(r', \theta', \phi'; r, \theta, \phi) \cdot r^2(e^{2\alpha r}) \cdot r^2 \cos\theta \cdot dr d\theta d\phi = \quad (30)$$

$$Ts \cdot P_0(\theta)^2 \cdot \int \frac{h(r', \theta', \phi'; r, \theta, \phi)}{r^2} \cdot r^2 \cos\theta \cdot dr d\theta d\phi =$$

$$Ts \cdot P_0(\theta)^2 \cdot \frac{1}{r'^2} \cdot \int h(r', \theta', \phi'; r, \theta, \phi) \cdot r^2 \cos\theta \cdot dr d\theta d\phi =$$

$$Ts \cdot P_0(\theta)^2 \cdot \frac{1}{r'^2} \cdot r'^2 \cdot \frac{cr}{2} \psi(\theta) = Ts \cdot P_0(\theta)^2 \cdot \frac{cr}{2} \psi(\theta)$$

As seen above, the scanning sonar system 1 of the third embodiment includes the transducer 2 for transmitting the acoustic sounding beam in specified directions underwater from the hull bottom of the ship 7 and receiving an echo returning from a single fish due to reflection of the transmitted acoustic sounding beam by means of the receiving beam, and the signal processing section 5 for processing signals picked up by the receiving beam. In this embodiment, the signal processing section 5 calculates an approximate value of the backscattering strength Ts of a typical single fish constituting the fish school FS by integrating the equivalent input sound intensities $P_M^2$ obtained by the receiving beam along three-dimensional directions according to the aforementioned principle of calculating the backscattering strength Ts. It is therefore possible to easily recognize the backscattering strength Ts of the typical single fish constituting the fish school FS. Furthermore, since the scanning sonar system 1 can determine the backscattering strength Ts of the typical single fish constituting the fish school FS even when the value of Ts is unknown, the scanning sonar system 1 can calculate an approximate value of the number N of fish in the fish school FS using the backscattering strength Ts thus determined.

While the invention has thus far been described with reference to the preferred embodiments and the specific examples thereof, the invention is not limited to these embodiments and specific examples but may be varied in various ways within the scope of the appended claims. For example, the underwater sounding apparatus of the invention need not necessarily be the aforementioned full-circle scanning sonar but may be a sector scanning sonar or a searchlight sonar.

In the case of the sector scanning sonar, it is necessary to take into consideration the dependency of transmit signal intensity $P_o^2$ and equivalent beam width $\psi$ on the angle $\phi$, and not on the angle $\theta$. The sector scanning sonar forms a fan-shaped transmitting beam having a specific central angle and tilt angle from a transducer and detects underwater information from individual directions within the transmitting beam with a pencil-like receiving beam which is steered across the fan-shaped transmitting beam. As the sector scanning sonar can detect the underwater information only in a fan-like area with a single transmission of acoustic waves, the sector scanning sonar mechanically rotates the transducer to search through a full-circle area when desired. In addition, the sector scanning sonar can vary the tilt angle of the transmitting beam by mechanically turning the transducer in a vertical plane when desired.

In the case of the searchlight sonar, it is not necessary to take into consideration dependency of transmit signal intensity $P_o^2$ and equivalent beam width $\psi$ on either the angle $\theta$ or the angle $\phi$. The searchlight sonar transmits a pencil-like acoustic beam in a single direction at a specific tilt angle from a transducer and detects underwater information from the same direction based on an echo signal received by the transducer. As the searchlight sonar can detect the underwater information only in a narrow pencil-like area with a single transmission of acoustic waves, the searchlight sonar searches through a full-circle area by mechanically rotating the transducer when desired. In addition, the searchlight sonar can vary the tilt angle of the pencil-like acoustic beam by mechanically turning the transducer in a vertical plane when desired.

Although the underwater sounding apparatus of the invention can preferably perform all of the aforementioned operations discussed in the first to third embodiments, the underwater sounding apparatus may be of a type which can perform only one or two of operations discussed in the first to third embodiments. In addition, with respect the first embodiment, the underwater sounding apparatus may be of a type which can perform the operations described in both or only one of Examples 1 and 2.

Furthermore, the underwater sounding apparatus of the invention may be of a type in which the transducer 2 transmits and receives the acoustic beam which is steered along both the substantially umbrella-shaped directional surface H1 and the substantially vertical planar directional surface H2 in a single transmit-receive cycle or of a type in which the transducer 2 successively transmits and receives multiple acoustic beams to perform such scanning.

While the invention has been described with reference to the preferred embodiments and the specific examples thereof, it is to be understood that these embodiments and specific examples are simply illustrative of the invention. Other arrangements may be devised by those skilled in the art which will embody the principles of the invention and fall within the spirit and scope thereof.

These arrangements and features described above may be embodied individually or in combination as appropriate in actual applications. Furthermore, in all of the underwater sounding apparatuses of the present invention, the transmitter section and the receiver section are not necessarily configured as separate units but may be incorporated in a single unit.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. An underwater sounding apparatus comprising:
a transmitter section for transmitting at least two acoustic signals along a plurality of directional surfaces that intersect in three dimensions;
a receiver section for receiving echoes returning from within a fish school due to reflection of the acoustic signal via receiving beams oriented along the plurality of directional surfaces that intersect in three dimensions; and
a signal processing section operatively connected to said receiver section, said signal processing section processing signals picked up by the receiving beams;
said signal processing section calculating fish quantity information about the fish school based on data obtained by the receiving beams.

2. The underwater sounding apparatus according to claim 1,
said signal processing section calculating fish quantity information about the fish school by volume integrating data obtained by the receiving beams.

3. The underwater sounding apparatus according to claim 1, said transmitter section transmitting the at least two acoustic signals from a ship;
wherein the directional surfaces include a substantially vertical planar directional surface which is perpendicular to a horizontal plane containing both a first axis extending horizontally forward from the ship and a second axis extending horizontally from the ship at right angles to the first axis and a substantially umbrella-shaped directional surface formed around the ship, said substantially umbrella-shaped directional surface intersecting both said horizontal plane and said substantially vertical, planar directional surface in three dimensions.

4. The underwater sounding apparatus according to claim 3,
said signal processing section calculating fish quantity information about the fish school by constructing pseudo-three-dimensional data from data obtained by the receiving beams.

5. The underwater sounding apparatus according to claim 4, said signal processing section constructing the pseudo-three-dimensional data by enlarging or reducing the data obtained by the receiving beams.

6. The underwater sounding apparatus according to claim 3,
said signal processing section binarizing data obtained by the receiving beams and calculating an approximate value of the volume of the fish school by constructing pseudo-three-dimensional data from the binarized data.

7. The underwater sounding apparatus according to claim 6, said signal processing section constructing the pseudo-three-dimensional data by enlarging or reducing the data obtained by the receiving beams.

8. The underwater sounding apparatus according to claim 6,
said signal processing section forming a three-dimensional orthogonal model by allocating the constructed pseudo-three-dimensional data to individual voxels, the underwater sounding apparatus further comprising:
a display operatively connected to said signal processing section, said display, displaying an image obtained such that said three-dimensional orthogonal model may be observed from a desired viewpoint as if projected on a two-dimensional plane.

9. The underwater sounding apparatus according to claim 8,
said signal processing section forming a three-dimensional orthogonal model by allocating the constructed pseudo-three-dimensional data to individual voxels constituting a three-dimensional orthogonal mesh model,
the underwater sounding apparatus further comprising:
a display operatively connected to said signal processing section, said display displaying an image obtained such that said three-dimensional orthogonal model may be observed from a desired viewpoint as if projected on a two-dimensional plane.

10. An underwater sounding apparatus comprising:
a transmitter section for transmitting at least one acoustic signal in at least one specific orthogonal direction;
a receiver section for receiving echoes returning from a single fish due to reflection of the transmitted acoustic signal via a plurality of pencil-like receiving beams respectively oriented in directions corresponding to the at least one specific orthogonal direction; and
a signal processing section operatively connected to said receiver section, said signal processing section processing signals picked up by the receiving beams;
said signal processing section calculating an approximate value of backscattering strength of the single fish by volume integrating data obtained by the receiving beams.

11. The underwater sounding apparatus according to claim 10, wherein the at least one specific orthogonal direction include $\theta$ and $\phi$ directions of a spherical coordinate system having an origin coinciding with a transducer of said transmitter section.

12. A method, comprising:
transmitting at least two acoustic signals along a plurality of directional surfaces that intersect in three dimensions;
receiving echoes returning from within a fish school due to reflection of the acoustic signal via receiving beams oriented along the plurality of directional surfaces that intersect in three dimensions; and
calculating fish quantity information about the fish school based on data obtained by the receiving beams.

13. The method according to claim 12,
said calculating step calculating fish quantity information about the fish school by volume integrating data obtained by the receiving beams.

14. The method according to claim 12, said transmitting step transmitting the at least two acoustic signals from a ship;
wherein the directional surfaces include a substantially vertical, planar directional surface which is perpendicular to a horizontal plane containing both a first axis extending horizontally forward from the ship and a second axis extending horizontally from the ship at right angles to the first axis and a substantially umbrella-shaped directional surface formed around the ship, said substantially umbrella-shaped directional surface intersecting both said horizontal plane and said substantially vertical, planar directional surface in three dimensions.

15. The method according to claim 14,
said calculating step calculating fish quantity information about the fish school by constructing pseudo-three-dimensional data from data obtained by the receiving beams.

16. The method according to claim 15, further comprising:
constructing the pseudo-three-dimensional data by enlarging or reducing the data obtained by the receiving beams.

17. The method according to claim 14, further comprising:
binarizing data obtained by the receiving beams;
said calculating step calculating an approximate value of the volume of the fish school by constructing pseudo-three-dimensional data from the binarized data.

18. The method according to claim 17, said constructing step constructing the pseudo-three-dimensional data by enlarging or reducing the data obtained by the receiving beams.

19. The method according to claim 17, further comprising:
forming a three-dimensional orthogonal model by allocating the constructed pseudo-three-dimensional data to individual voxels; and
displaying an image obtained such that said three-dimensional orthogonal model may be observed from a desired viewpoint as if projected on a two-dimensional plane.

20. The method according to claim 18,
forming a three-dimensional orthogonal model by allocating the constructed pseudo-three-dimensional data to individual voxels; and
displaying an image obtained such that said three-dimensional orthogonal model may be observed from a desired viewpoint as if projected on a two-dimensional plane.

21. A method, comprising:
transmitting at least one acoustic signal in at least one specific orthogonal direction;
receiving echoes returning from a single fish due to reflection of the transmitted acoustic signal via a plurality of pencil-like receiving beams oriented in directions corresponding to the at least one specific orthogonal direction; and
calculating an approximate value of backscattering strength of the single fish by volume integrating data obtained by said receiving step.

22. The method according to claim 21, wherein the at least one specific orthogonal direction include $\theta$ and $\phi$ directions of a spherical coordinate system having an origin coinciding with a transducer used by said transmitting step.

* * * * *